(12) United States Patent
Toutov et al.

(10) Patent No.: US 11,773,116 B2
(45) Date of Patent: *Oct. 3, 2023

(54) HYDROSILYLAMINES AND FLUOROSILYLAMINES AND METHODS OF MAKING THE SAME

(71) Applicant: California Institute Of Technology, Pasadena, CA (US)

(72) Inventors: Anton A. Toutov, Pasadena, CA (US); Kerry N. Betz, Boulder, CO (US); Andrew M. Romine, San Diego, CA (US); Robert H. Grubbs, South Pasadena, CA (US)

(73) Assignee: California Institute of Technology, Pasadena, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/192,129

(22) Filed: Mar. 4, 2021

(65) Prior Publication Data

US 2021/0198291 A1 Jul. 1, 2021

Related U.S. Application Data

(63) Continuation of application No. 16/997,226, filed on Aug. 19, 2020, now Pat. No. 10,995,105, which is a continuation of application No. 16/244,637, filed on Jan. 10, 2019, now Pat. No. 10,781,221.

(60) Provisional application No. 62/616,585, filed on Jan. 12, 2018.

(51) Int. Cl.
*C07F 7/10* (2006.01)

(52) U.S. Cl.
CPC .................................... *C07F 7/10* (2013.01)

(58) Field of Classification Search
None
See application file for complete search history.

(56) References Cited

U.S. PATENT DOCUMENTS

| | | | |
|---|---|---|---|
| 3,933,889 | A | 1/1976 | Magerlein |
| 9,000,167 | B2 | 4/2015 | Grubbs et al. |
| 9,556,080 | B2 | 1/2017 | Toutov et al. |
| 9,809,607 | B2 | 11/2017 | Toutov et al. |
| 9,908,840 | B2 | 3/2018 | Grubbs et al. |
| 10,125,153 | B2 | 11/2018 | Toutov et al. |
| 10,259,831 | B2 | 4/2019 | Toutov et al. |
| 10,781,221 | B2 | 9/2020 | Toutov et al. |

OTHER PUBLICATIONS

U.S. Appl. No. 16/997,226, filed Aug. 19, 2020.
U.S. Appl. No. 16/244,637, filed Jan. 10, 2019.
Boebel, et al., "Silyl-Directed, Iridium-Catalyzed ortho-Borylation of Arenes. A One-Pot ortho-Borylation of Phenols, Arylamines and Alkyarenes", J. Am. Chem Soc., 2008, 130 (24), pp. 7534-7535.
Greene and Wuts, Protective Groups in Organic Synthesis, 3rd Ed., 1999, p. 600.
Kunai et al., Organometallics, 1992, 11, 2708-2711.
Li et al., Angew. Chem. Int. 2014, 53(32), pp. 8471-8474.
Mitsudome et al., Chem. Eur. J., 2015, 21(8), 3202-3205.
Wangler et al., Applied Sciences, 2012, 2, 277-302.

*Primary Examiner* — Clinton A Brooks
(74) *Attorney, Agent, or Firm* — BakerHostetler

(57) ABSTRACT

The present disclosure is directed to hydrosilyl amines and fluorosilyl amines and methods of making the same.

5 Claims, 3 Drawing Sheets

HYDROSILYLAMINES AND FLUOROSILYLAMINES AND METHODS OF MAKING THE SAME

CROSS REFERENCE TO RELATED APPLICATIONS

This application is a continuation of U.S. patent application Ser. No. 16/997,226, filed Aug. 19, 2020, that is a continuation of U.S. patent application Ser. No. 16/244,637, filed on Jan. 10, 2019, that issued as U.S. Pat. No. 10,781,221 on Sep. 22, 2020, that claims the benefit of priority to U.S. Patent Application Ser. No. 62/616,585, filed Jan. 12, 2018, the contents of each of which is incorporated by reference herein for all purposes.

GOVERNMENT RIGHTS

This invention was made with government support under Grant No. CHE1212767 awarded by the National Science Foundation. The government has certain rights in the invention.

TECHNICAL FIELD

The present disclosure is directed at methods for silylating aromatic-substituted amines using alkali metal hydroxide, alkoxide, or hydride catalysts and hydrosilane or hydrosiloxane reagents, as well as the compositions involved in these methods and the products that result therefrom.

BACKGROUND

The ability to silylate organic moieties has attracted significant attention in recent years, owing to the utility of the silylated materials in their own rights or as intermediates for other important materials used, for example, in agrichemical, pharmaceutical, and electronic material applications.

The formation of N—Si bonds is relevant to the preparation of materials such as various oligo- and polysilazanes, the protection of amines in complex molecule synthesis, the construction of enediazines and enamines, and in the synthesis of heterocyclic motifs by cycloaddition reactions. Currently, the synthesis of silylamines occurs most often by the interception of halosilanes with amines in the presence of stoichiometric quantities of strong bases. The dehydrocoupling of amines using hydrosilanes is an attractive approach, though past attempts to do so have only been achieved using transition metal catalysis or using otherwise complex metal species of various kinds. The complexity of the prior systems using amine and hydrosilane reagents, as well as chemoselectivity of the dehydrocoupling, remain a challenge.

The present invention takes advantage of the discoveries cited herein to avoid at least some of the problems associated with previously known methods.

SUMMARY

The present disclosure is directed to the dehydrogenative coupling of Si—H bonds and the N—H bonds of aromatic-substituted amines. The disclosure details the first example of silylating N—H bonds of aromatic-substituted amines (i.e., N—H+Si-H→N—Si+H—H) operable with only alkaline salts of alkali metals, alkaline earth metals, or alkali metal hydrides as the catalyst.

A cross-dehydrogenative synthesis of silylamines employing abundantly available and inexpensive alkali metal hydroxides (i.e., NaOH and KOH) and potassium tert-butoxide as the catalysts is specifically exemplified, though other hydrides, hydroxides, and alkoxides are also expected to work as effective catalysts. The method allows for the direct coupling of an aromatic-substituted amine N—H bond and a silane Si—H bond to furnish the corresponding N—Si bond in a single step, and without the production of stoichiometric salt byproducts. The catalysis proceeds under mild conditions, in the absence of transition metal salts, hydrogen acceptors, or other additives and liberates dihydrogen as the sole by-product. The scope of the method appears to be broad, enabling the direct silylation of primary and secondary aromatic-substituted amines, including such amines as anilines and benzylamines (and their heteroaryl analogs). The scope of the hydrosilane is very good and enables the introduction of large and small silyl functionalities containing aryl, alkyl, alkoxide, and other substituents on silicon. The scope of the amine appears to be also broad, containing benzylamines and anilines (and their heteroaryl analogs) substituted with halides, ethers, and heteroarenes. The extent of silylation in primary amines can be controlled by both the conditions and the steric demand of the hydrosilane (See FIG. 1). This excellent range of hydrosilanes and broad amine scope is of value in a number of applications including protecting group chemistry, in particular, the use of an N—SiR$_2$H functionality (e.g., where R=Et, currently installed with iridium catalysis) to direct C—H oxygenation, halogenation, borylation, and arylation chemistries, materials science, and even drug discovery (See FIG. 5). Facile scalability, low cost, and broad scope make this a practical and attractive N—Si bond construction strategy. The below demonstrates the N—H functionalities which have been successfully silylated (products either isolated by distillation or simply observed by GC and NMR).

Various embodiments includes methods of forming an N—Si silyl bond, each method comprising or consisting essentially of contacting an organic substrate comprising an aromatic-substituted amine having at least one N—H bond with a mixture comprising or consisting essentially of (a) at least one hydrosilane or hydrosiloxane and (b) at least one hydroxide or alkoxide or hydride, under conditions sufficient to form the N—Si bond.

Additional embodiments also include the compositions used to affect these transformations. Still further embodiments include those amino-silane products produced by these methods, and descriptions directed to any one of these categories (methods, compositions or mixtures, and the products derived or derivable therefrom) should be understood to apply to the other categories.

In certain embodiments, the aromatic-substituted amine may present an N—H bond from an optionally substituted exocyclic aromatic-substituted amine position of an optionally substituted aromatic group, the amine being separated from the aromatic group by 0 or 1 methylene linkage (e.g., aniline or benzylamine). For example, the aromatic amine may be described as comprising a structure of Formulae (I) or (II)

-continued

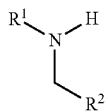
(II)

where

R[1] is H, an optionally substituted alkyl or alkylene, an optionally substituted alkenyl or alkenylene, and optionally substituted alkynyl or alkynylene, an optionally substituted aryl or arylene, an optionally substituted heteroalkyl or heteroalkylene, an optionally substituted heteroaryl or heteroarylene, an optionally substituted aralkyl or aralkylene, an optionally substituted heteroaralkyl or heteroaralkylene, or optionally substituted metallocene; and R[2] is an optionally substituted aryl or heteroaryl group.

In certain embodiments, R[1] and R[2] are separate, discrete pendants from the amine nitrogen, wherein, for example, R[1] is an optionally substituted alkyl, optionally substituted alkenyl, optionally substituted alkynyl, optionally substituted aryl, optionally substituted heteroalkyl, optionally substituted heteroaryl, or optionally substituted aralkyl.

In other embodiments, R[1] and R[2] are linked to form a cyclic moiety such as when R[1] is an optionally substituted alkylene, optionally substituted alkenylene, optionally substituted alkynylene, optionally substituted arylene, optionally substituted heteroalkylene, optionally substituted heteroarylene, or optionally substituted aralkylene.

In other embodiments, the aromatic moiety R[2] comprises an aryl group (non-limiting examples including optionally substituted phenyl or optionally substituted naphthyl). In other embodiments, the aromatic moiety R[2] comprises a heteroaryl group (non-limiting examples including optionally substituted pyridinyl or optionally substituted quinolinyl). Other aryl and heteroaryl moieties, and optional substituents are described elsewhere herein.

In some embodiments, the at least one hydrosilane or hydrosiloxane comprises a compound of Formula (I), Formula (II), Formula (III), or Formula (IV):

where m is 0, 1, or 2;

n is 10 to 100; and each R is independently optionally substituted $C_{1-12}$ alkyl or $C_{1-12}$ heteroalkyl (e.g., an isostere thereof), optionally substituted $C_{6-20}$ aryl or $C_{5-20}$ heteroaryl, optionally substituted $C_{7-30}$ alkaryl or $C_{6-30}$ heteroalkaryl, optionally substituted $C_{7-30}$ aralkyl or $C_{6-30}$ heteroaralkyl, optionally substituted —O—$C_{1-12}$ alkyl or —O—$C_{1-12}$ heteroalkyl, optionally substituted —O—$C_{7-20}$ aryl or —O—$C_{5-20}$ heteroaryl, optionally substituted —O—$C_{7-30}$ alkaryl or —O—$C_{6-30}$ heteroalkaryl, or optionally substituted —O—$C_{7-30}$ aralkyl or —O—$C_{6-30}$ heteroaralkyl, and, if substituted, the substituents may be phosphonato, phosphoryl, phosphanyl, phosphino, sulfonato, $C_1$-$C_{20}$ alkylsulfanyl, $C_{6-20}$ arylsulfanyl, $C_1$-$C_{20}$ alkylsulfonyl, $C_{6-20}$ arylsulfonyl, $C_1$-$C_{20}$ alkylsulfinyl, $C_{6-20}$ arylsulfinyl, sulfonamido, amino, amido, imino, nitro, nitroso, hydroxyl, $C_1$-$C_{20}$ alkoxy, $C_{6-20}$ aryloxy, $C_2$-$C_{20}$ alkoxycarbonyl, $C_5$-$C_{20}$ aryloxycarbonyl, carboxyl, carboxylato, mercapto, formyl, $C_1$-$C_{20}$ thioester, cyano, cyanato, thiocyanato, isocyanate, thioisocyanate, carbamoyl, epoxy, styrenyl, silyl, silyloxy, silanyl, siloxazanyl, boronato, boryl, or halogen, or a metal-containing or metalloid-containing group, where the metalloid is Sn or Ge, or where the substituents optionally provide a tether to an insoluble or sparingly soluble support media comprising alumina, silica, or carbon.

The compositions of Formulae (I) and (II) are usefully employed in certain systems and methods. Exemplary hydrosilanes and hydrosiloxanes are described elsewhere herein.

In certain embodiments, the at least one hydroxide or alkoxide comprises sodium hydroxide, potassium hydroxide, a sodium alkoxide, or a potassium hydroxide. These may be considered as independent embodiments in their own right, or in any combination thereof. In some embodiments, the hydroxide is an alkali metal or alkaline earth metal hydroxide, for example sodium hydroxide (NaOH) or potassium hydroxide (KOH). In some embodiments, the alkoxide is an alkali metal or alkaline earth metal alkoxide, such as sodium alkoxide (e.g., NaOMe, NaOEt, NaO-t-Bu) or potassium alkoxide (e.g., KOMe, KOEt, KO-t-Bu, KO-t-amyl). In some embodiments, alkali metal hydride, such as sodium hydride (NaH) or potassium hydride (KH) may also or alternatively affect the transformation.

In certain other embodiments, the mixtures or composition are independently free of or substantially free of one or more of (a) transition-metal species; (b) added transition-metal species; (c) crown ethers or cryptands; (d) oxygen; and/or (e) water. The methods are operable in the substantial absence of other electromagnetic or thermal initiation or propagation.

The methods are operable with a wide array of substrates as defined elsewhere herein. Compounds having two or more aromatic-substituted amine N—H bonds also provide mono- or di-silylated products, generally in discrete, sequential reactions. The substrates include individual chemical compounds, oligomers, and polymers comprising the aromatic-substituted amines described herein.

In certain embodiments employing silanes having two or three Si—H bonds (e.g., $R_2SiH_2$ or $(R)SiH_3$), contacting a second or third organic substrate comprising an aromatic-substituted amine N—H bond, either at the same time or sequentially, can form a di- or tri-amine-silane product.

Still further embodiments include those systems for silylating an organic substrate comprising an aromatic-substituted amine N—H bond, said system comprising or consisting essentially of a mixture of (a) at least one organosilane and (b) an alkali metal oe alkaline earth metal hydroxide, alkoxide, or hydride, and (c) at least one substrate. The systems are described at least in terms as sufficient to accommodate the methods described herein. In some embodiments, the system further comprises the presence of a silylated aromatic-substituted amine derived from the reaction between the substrate and the at least one organosilane.

While the embodiments are described mainly in terms of methods and systems for affecting these transformations, it should be appreciated that any compound derived from these methods and systems, which have not been previously described or are not otherwise accessible by other practicable means, are considered within the scope of this invention.

BRIEF DESCRIPTION OF THE DRAWINGS

The present application is further understood when read in conjunction with the appended drawings. For the purpose of illustrating the subject matter, there are shown in the drawings exemplary embodiments of the subject matter; however, the presently disclosed subject matter is not limited to the specific methods, devices, and systems disclosed. In addition, the drawings are not necessarily drawn to scale. In the drawings:

FIGS. 5(A-B) illustrate several exemplary reactions consistent with this disclosure, as relevant to directing group chemistries.

DETAILED DESCRIPTION OF ILLUSTRATIVE EMBODIMENTS

Figure 1:
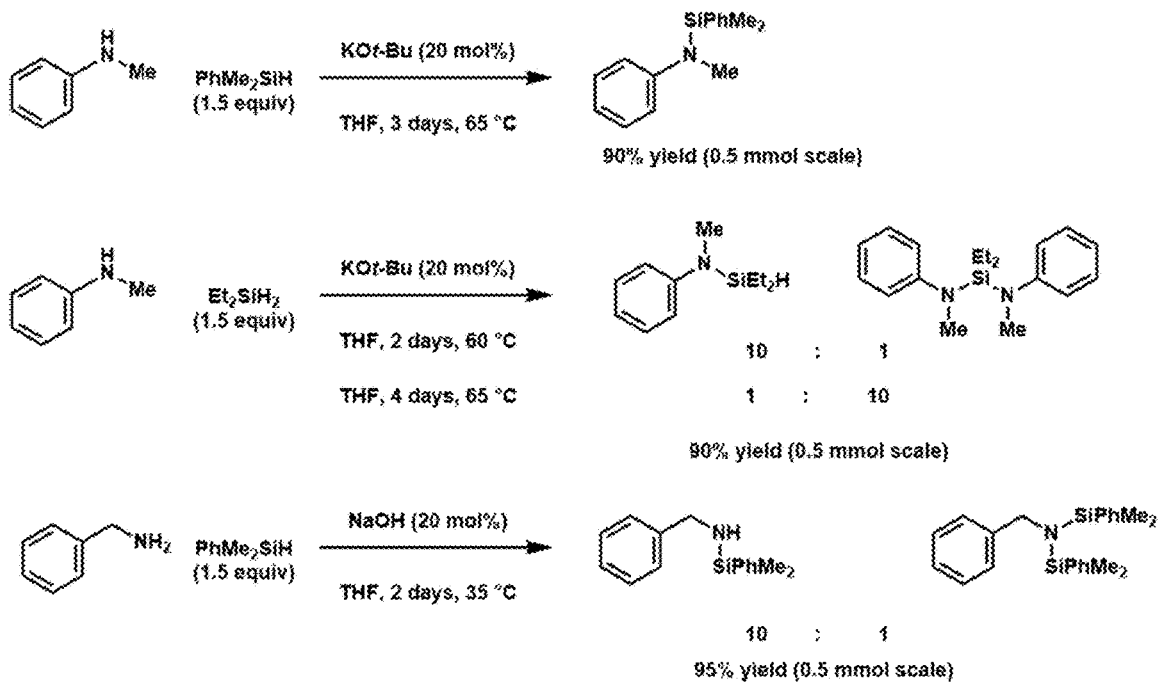
FIG. 1 illustrates several exemplary reactions consistent with this disclosure.
Figure 2:
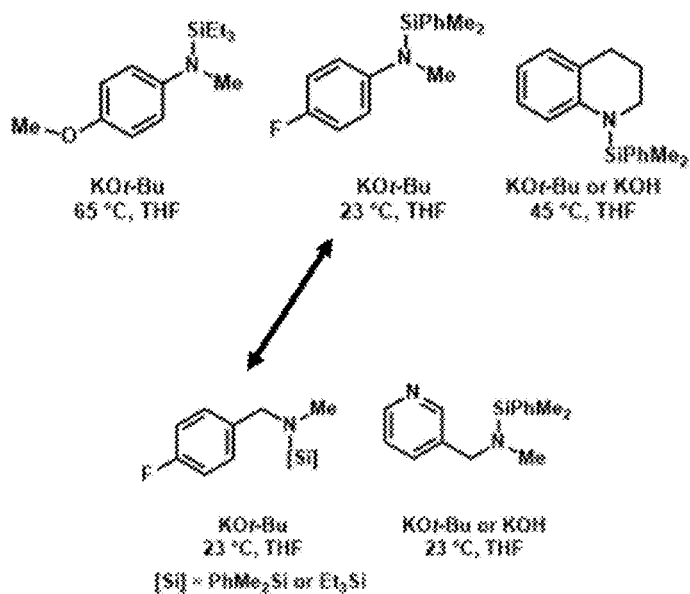
FIG. 2 illustrates several additional exemplary reactions consistent with this disclosure. Note particularly the comparable reaction conditions used to silylate the fluorophenylamine and the fluorobenzylamine.

The present invention is founded on a set of reactions, each of which relies on simple mixtures of organosilanes and strong bases, including alkali metal hydroxide, alkoxides, and hydrides (preferably sodium and/or potassium alkoxides and/or hydroxides) which together form in situ systems (the structure and nature of the active species is still unknown) able to silylate aromatic-substituted amine groups, without the presence of transition metal catalysts, UV radiation or electrical (including plasma) discharges. These reactions are relevant as an important advance in developing practical methods for the preparation of products important for agrochemical, electronics, fine chemical, and pharmaceutical applications. Importantly this reaction is of great interest since it produces only environmentally benign dihydrogen as the byproduct and can avoid toxic metal waste streams as would be observed with nearly all other approaches proposed in the literature towards this end. The remarkable facility exhibited by these systems provides a useful tool in the kit of chemists in these fields. This utility can be leveraged when combined with other follow-on reactions.

The present invention may be understood more readily by reference to the following description taken in connection with the accompanying Figures and Examples, all of which form a part of this disclosure. It is to be understood that this invention is not limited to the specific products, methods, conditions or parameters described or shown herein, and that the terminology used herein is for the purpose of describing particular embodiments by way of example only and is not intended to be limiting of any claimed invention. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer to compositions and methods of making and using said compositions. That is, where the disclosure describes or claims a feature or embodiment associated with a composition or a method of making or using a composition, it is appreciated that such a description or claim is intended to extend these features or embodiment to embodiments in each of these contexts (i.e., compositions, methods of making, and methods of using).

The present disclosure includes embodiments related chemical systems and methods for silylating aromatic-substituted amines, as well as the products derived or derivable from these methods, and claims directed to each of these categories is considered within the scope of this disclosure. Specific embodiments provide methods of forming an N—Si silyl bond, the method comprising or consisting essentially of contacting an organic substrate comprising an aromatic-substituted amine having at least one N—H bond with a mixture comprising or consisting essentially of (a) at least one hydrosilane or hydrosiloxane and (b) at least one hydroxide or alkoxide, under conditions sufficient to form the N—Si bond. Metal hydrides are believed also to function as effective catalysts in lieu or in addition to the hydroxide/alkoxide. The reactions operate well in the complete absence of (or substantially complete absence) of transition-metal compounds, and in preferred embodiments, the reactions are conducted in the substantial absence of transition-metal species. As further described herein, additional embodiments provide that the reaction mixture is free of added transition-metal species. Likewise, these methods are also operable in the absence or substantially complete absence of other electromagnetic or thermal triggers needed for initiation or propagation. That is, these embodiments do not need UV irradiation or electric or plasma discharge conditions to operate.

It should be appreciated that the phrase "conditions sufficient to form the N—Si bond" at least implies that the methods result in the formation of the N—Si bond.

In some embodiments, the mixture is free of added solvent, and the reaction is carried out neat. In other embodiments, the mixture further comprises a solvent. In certain embodiments, the solvent is an aprotic oxygen donor solvent. Exemplary aprotic oxygen donor solvents include or comprise dimethylacetamide (DMA), dimethyl formamide (DMF), dimethylsulfoxide, 1,2-dimethoxyethane (DME), a dioxane, a dialkyl ether, hexamethylphosphoramide (HMPA), N-methylpyrrolidone, tetrahydrofuran, 2-methyl-tetrahydrofuran, or a mixture thereof or a mixture containing such solvent(s). Ether solvents, such as tetrahydrofurans (including 2-methyltetrahydrofuran), diethyl and dimethyl ether, 1,2-dimethoxyethane, dioxane, and alkyl terminated glycols appear to work well, either in the presence or absence of hydrocarbon co-solvents. In some embodiments, the combination of ether solvents and DMF is effective. The use of protic solvents (e.g., alcohols) is less favored.

In independent embodiments, the reaction is conducted in the presence, or preferably in the substantial absence, of oxygen, as described elsewhere herein.

In some embodiments, the reaction is conducted in the substantial absence of water. Such embodiments are elaborated more fully elsewhere herein, but in certain preferred of these embodiments, the reactions are conducted in the presence of less than 100 ppm water, less than 50 ppm water, or is free of added water.

Figure 3:
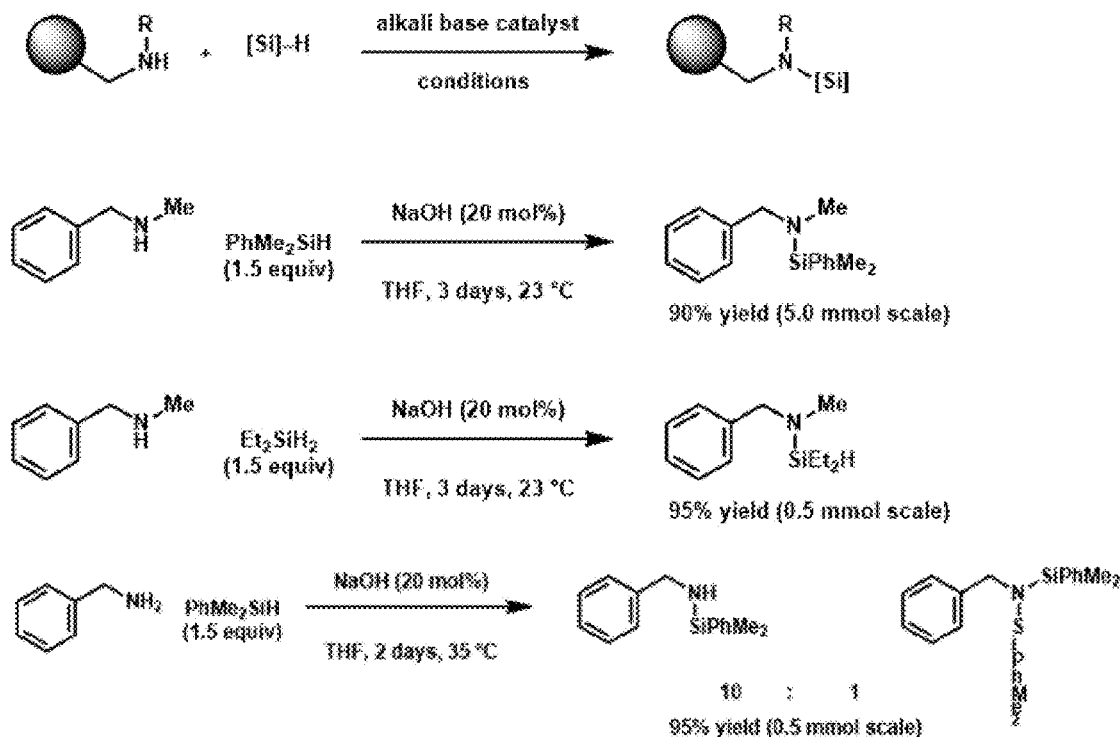
FIG. 3 shows several reactions that illustrate the ability to disilylate primary amines.

In some embodiment, the conditions sufficient to form the N—Si bond includes the use of thermal heating the mixture at a temperature in a range of from 0° C. to 150° C., or higher, for times ranging from 2-4 hours to several days, though practically, the reactions proceed to good yield and selectivity when conducted at a temperate in a range of ambient room temperature (e.g., 25° C.) to about 85° C., depending on the nature of the aromatic-substituted amine. In some embodiments, the conditions further comprise maintaining the mixture at one or more temperatures in this range for a time defined by a range of from about 2 hours to about 2 weeks, with various subsets of time defined further herein. Further, by staging the reaction temperatures (for example, from even 45° C. to 65° C.), it is possible to select and provide products that are either monosilylated or disilylated on substrates having two apparently equivalent aromatic-substituted nitrogen amine N—H bonds (see, e.g., FIG. 3).

Typically, experiment described herein were conducted using ratios of aromatic-substituted amine substrate:hydrosilane:alkoxide/hydroxide base in ratios of 1 equiv.:0.5 to 1.5 equiv.:0.2 equiv, but these conditions should not be seen as particularly limiting. In certain embodiments, the ratio of aromatic-substituted amine N—H to hydrosilane Si—H will depend on the particular reaction being considered, but typically the hydrosilane is present in an amount that the number of molar equivalents of Si—H bonds to N—H bonds is in a range of from 1:1 up to 3:1, 5:1, or 10:1. Such large excesses beyond the normal stoichiometric amounts are not required, but may be useful depending on the relative volatility of the amines and hydrosilanes, the free volumes associated with the reaction container, and the expected reactivities of the system associated with the other parts of the substrate. In certain, the molar ratio of the Si—H:N—H bonds of the corresponding hydrosilanes or hydrosiloxanes and aromatic-substituted amines is in a range of from 1 to 1.5, from 1.5 to 2, from 2 to 2.5, from 2.5 to 3, from 3 to 5, from 5 to 10, or higher, or any combination of two or more of these ranges.

Given the apparent catalytic nature of alkoxide or hydroxide (or hydride) catalyst, it should be readily apparent that the relative amounts of these materials is even more flexible. Clearly, greater relative amounts of the base catalysts will result in more efficient conversions, but molar ratios of alkoxide/hydroxide to substrate N—H bonds may range from about 0.1 to 1, or may even be present in stoichiometric excess. Conveniently, the ratio of the base to substrate bonds is provided from 0.01 to 0.05, from 0.05 to 0.1, from 0.1 to 0.2, from 0.2 to 0.3, from 0.3 to 0.4, from 0.4 to 0.5, from 0.5 to 0.75, from 0.75 to 1, from 1 to 1.5, or the ratio may be defined in terms of two or more of these ranges.

Figure 4:
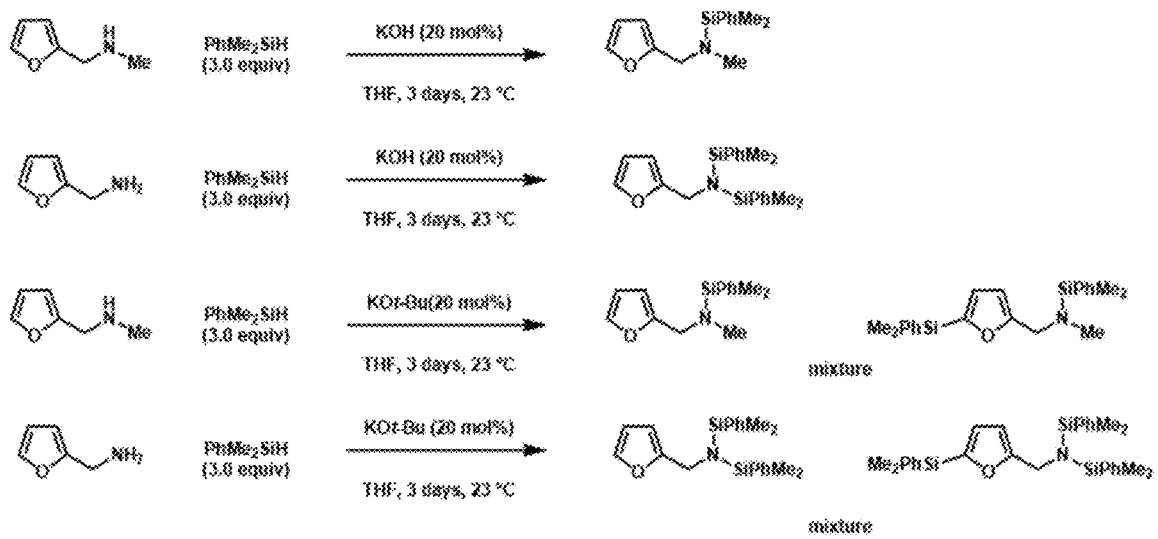
FIG. 4 shows several reactions that illustrate the ability to disilylate primary amines and the potential competitive silylation when the aromatic moiety is a heteroaryl group.

It is recognized that certain of the aromatic-substituted substrates described herein are also susceptible to dehydrogenative coupling of C—H and Si—H bonds, under conditions such as described herein, such that the silylation of C—H and N—H bonds may be coincidental under the reaction conditions (though the information presented in FIG. 4 suggests that N—H bonds may be more reactive than C—H bonds toward the silylating conditions). Such C—H/Si—H coupling reactivities are well demonstrated, for example, in U.S. Pat. Nos. 9,000,167 and 9,809,607 and using the same or similar combination of hydrosilanes and inorganic bases as described herein. These references are incorporated in their entireties for all purposes, or for at least the reaction conditions used to affect the C—H silylations.

For the exocyclic aromatic-substituted amines described herein, the reaction conditions sufficient to form the N—Si bonds appear to be consistent with those described previously for the formation of C—Si bond.

In certain embodiments, the aromatic-substituted amine having at least one N—H bond comprises an exocyclic structure of Formulae (I) or (II):

where $R^1$ is H, an optionally substituted alkyl or alkylene, an optionally substituted alkenyl or alkenylene, and optionally substituted alkynyl or alkynylene, an optionally substituted aryl or arylene, an optionally substituted heteroalkyl or heteroalkylene, an optionally substituted heteroaryl or heteroarylene, an optionally substituted aralkyl or aralkylene, an optionally substituted heteroaralkyl or heteroaralkylene, or optionally substituted metallocene; and $R^2$ is an optionally substituted aryl or heteroaryl group.

For the sake of absolute clarity, the compounds of Formula (I) and (II) are seen as independent embodiments.

Exemplary aryl $R^2$ groups include optionally substituted phenyl, diphenyl, naphthyl, anthracenyl, or similar fused carbocyclic systems.

Exemplary heteroaryl $R^2$ groups include optionally substituted furan, pyrrole, thiophene, pyrazole, imidazole, triazole, isoxazole, oxazole, thiazole, isothiazole, oxadiazole, pyridine, bipyridine, terpyridine, pyrrolopyridine, phenantholine, pyridazine, pyrimidine, pyrazine, triazone, benzofuran, benzopyrrole, benzothiophene, isobenzofuran, isobenzopyrrole, isobenzothiophene, indole, isoindole, indolizine, indazole, azaindole, benzisoxazole, benzoxazole, quinoline, isoquinoline, cinnoline, quinazoline, naphthyridine, 2,3-dihydrobenzofuran, 2,3-dihydrobenzopyrrole, 2,3-dihydrobenzothiophene, dibenzofuran, xanthene, dibenzopyrol, or dibenzothiophene. Optionally substituted furan, pyrrole, thiophene, pyrazole, imidazole, benzofuran, benzopyrrole, benzothiophene, indole, azaindole dibenzofuran, xanthene, dibenzopyrrole, or dibenzothiophene moiety are preferred substituents.

In certain of these embodiments, $R^1$ is H, i.e., a primary aromatic-substituted amine. In such cases, selection of appropriate reactions conditions can provide both mono- and/or di-silylate amine derivatives (i.e., one or two N—Si bonds, respectively).

In other independent embodiments, $R^1$ and $R^2$ are separate, non-linked moieties, where $R^1$ is an optionally substituted alkyl, optionally substituted alkenyl, optionally substituted alkynyl, optionally substituted aryl, optionally substituted heteroalkyl, optionally substituted heteroaryl, or optionally substituted aralkyl and $R^2$ is an optionally substituted aryl or heteroaryl group. For example, such embodiments include substituted anilines, aminopyridines, amino naphthylamines, biphenyl amines, or quinolinyl amines.

In other embodiments $R^1$ is linked with $R^2$ to form a cyclic moiety such that $R^1$ is an optionally substituted alkylene, optionally substituted alkenylene, optionally substituted alkynylene, optionally substituted arylene, optionally substituted heteroalkylene, optionally substituted heteroarylene, or optionally substituted aralkylene. Exemplary structures in this group include, without limit, indoline, any isomer of 2,3-dihydro-1H-pyrrolo-pyridine, any isomer of 1,2,3,4-tetrahydroquinoline, 1,2,3,4-tetrahydronaphthyridine, 2,3-dihydro-1H-benzo[d]imidazole, any isomer of 2,3-dihydro- 1H-imidazo[4,5]pyridine, 2,3-dihydro-1H-imidazo[4,5-d]pyridazine, 8,9-dihydro-7H-purine, 6,7-dihydro-5H-imidazo[4,5-e][1,2,4]triazine, e.g.:

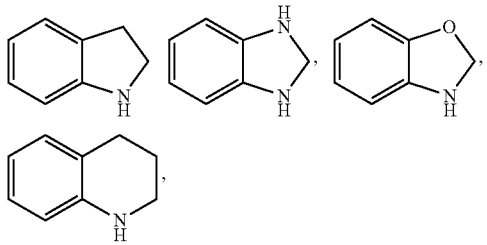

and their pyridinyl, pyridazine, triazine, and tetrazine analogues, as represented by

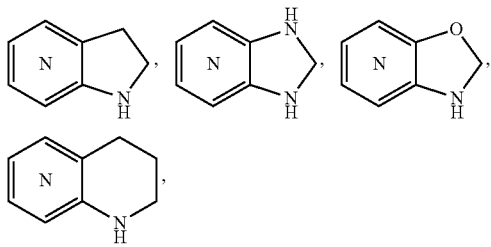

where the

represents any positional isomer of the fused pyridinyl, pyridazine, triazine, tetrazine ring.

Each of $R^1$ and $R^2$ may be optionally substituted with one or more substituents as are described more fully herein. Additionally, in certain preferred embodiments, $R^1$ and $R^2$ are optionally substituted with one or more of $C_{1-12}$ alkyl, $C_{1-12}$ alkoxyl, $C_{2-12}$ alkoxycarbonyl, $C_{6-20}$ aryloxy, $C_7$-$C_{21}$ arylkoxycarbonyl, $C_1$-$C_{20}$ alkylsulfanyl, $C_{6-20}$ arylsulfanyl, $C_1$-$C_{20}$ alkylsulfonyl, $C_{6-20}$ arylsulfonyl, $C_1$-$C_{20}$ alkylsulfinyl, carbamoyl, —$C_{2-20}$ carboxylato, di-$C_{1-20}$alkylaminocarbonyl, halo, cyano, isocyanate, mercapto, nitro, oligopeptide, peptide, polypeptide, polyglycol, thiocyanato, thioisocyanato, or sulfonato.

Turning next to the silylating agent, as used herein to describe the systems and methods, the terms "organosilane" or "hydrosilane" may be used interchangeably and refer to a compound or reagent having at least one silicon-hydrogen (Si—H) bond and generally one carbon-containing moiety. The hydrosilane may further contain a silicon-carbon, a silicon-oxygen (i.e., encompassing the terms "hydrosiloxane" and "organosiloxane"), a silicon-nitrogen bond, or a combination thereof, and may be monomeric, or contained within an oligomeric or polymeric framework, including being tethered to a heterogeneous or homogeneous support structure.

In certain embodiments, the at least one hydrosilane comprises a hydrosilane or hydrosiloxane of Formula (I), Formula (II), Formula (III), or Formula (IV):

$$(R)_{3-m}Si(H)_{m+1} \quad (I)$$

$$R\text{-}[\text{---SiH(R)---O---}]_n\text{-}R \quad (II)$$

$$(R)_{2-m}(H)_{m+1}Si\text{---}Si(R)_{3-m}(H)_m \quad (III)$$

$$(R)_{3-m}(H)_m Si\text{---}Si(R)_{3-m}(H)_m \quad (IV)$$

where m is 0, 1, or 2;
n is 10 to 100; and
each R is independently optionally substituted $C_{1-12}$ alkyl or $C_{1-12}$ heteroalkyl (or an isostere thereof), optionally substituted $C_{6-20}$ aryl or $C_{5-20}$ heteroaryl, optionally substituted $C_{7-30}$ alkaryl or $C_{6-30}$ heteroalkaryl, optionally substituted $C_{7-30}$ aralkyl or $C_{6-30}$ heteroaralkyl, optionally substituted —O—$C_{1-12}$ alkyl or —O—$C_{1-12}$ heteroalkyl, optionally substituted —O—$C_{7-20}$ aryl or —O—$C_{5-20}$ heteroaryl, optionally substituted —O—$C_{7-30}$ alkaryl or —O—$C_{6-30}$ heteroalkaryl, or optionally substituted —O—$C_{7-30}$ aralkyl or —O—$C_{6-30}$ heteroaralkyl, and, if substituted, the substituents may be phosphonato, phosphoryl, phosphanyl, phosphino, sulfonato, $C_1$-$C_{20}$ alkylsulfanyl, $C_{6-20}$ arylsulfanyl, $C_1$-$C_{20}$ alkylsulfonyl, $C_{6-20}$ arylsulfonyl, $C_1$-$C_{20}$ alkylsulfinyl, $C_{6-20}$ arylsulfinyl, sulfonamido, amino, amido, imino, nitro, nitroso, hydroxyl, $C_1$-$C_{20}$ alkoxy, $C_{6-20}$ aryloxy, $C_2$-$C_{20}$ alkoxycarbonyl, $C_5$-$C_{20}$ aryloxycarbonyl, carboxyl, carboxylato, mercapto, formyl, $C_1$-$C_{20}$ thioester, cyano, cyanato, thiocyanato, isocyanate, thioisocyanate, carbamoyl, epoxy, styrenyl, silyl, silyloxy, silanyl, siloxazanyl, boronato, boryl, or halogen, or a metal-containing or metalloid-containing group, where the metalloid is Sn or Ge, or where the substituents optionally provide a tether to an insoluble or sparingly soluble support media comprising alumina, silica, or carbon.

In certain embodiments, the at least one hydrosilane or hydrosiloxane is a compound of Formula (I):

$$(R)_{3-m}Si(H)_{m+1} \quad (I),$$

preferably where m is 0 or 1.

Exemplary, non-limiting organosilanes may independently include $(R)_3SiH$ or $(R)_2SiH_2$, or $(R)SiH_3$.

In other embodiments, the at least one hydrosilane or hydrosiloxane is a compound of Formula (III):

$$(R)_{2-m}(H)_{m+1}Si\text{---}Si(R)_{3-m}(H)_m \quad (III),$$

preferably where m is 0 or 1.

In other embodiments, the at least one hydrosilane or hydrosiloxane is a compound of Formula (IV):

$$(R)_{3-m}(H)_m Si\text{---}Si(R)_{3-m}(H)_m \quad (IV).$$

Strictly speaking, compounds of Formula (IV), when m=0 are not hydrosilanes, but such disilanes have been seen to be operable as silylating agents for other substrates and it is expected that these will work in the present system as well. See, for example, U.S. Pat. No. 9,556,080, which is incorporated by reference herein for all purposes, or at least for the range of disilanes and the reaction conditions used in their use.

Hydrosilanes (i.e., where the Si is bonded only to C and H) are preferred. Hydrosilanes where each of R is independently $C_{1-6}$alkyl, $C_{2-6}$alkenyl, phenyl, tolyl, benzyl, phenethyl, or pyridinyl are more preferred. Hydrosilanes of the formula $(R)_3SiH$, where each R is independently methyl, ethyl, propyl, or butyl are also more preferred.

In specific embodiments, the at least one hydrosilane or hydrosiloxane comprises EtMe$_2$SiH, Et$_3$SiH, (n-Bu)$_3$SiH, (i-Pr)$_3$SiH, Et$_2$SiH$_2$, Ph$_2$MeSiH, (t-Bu)Me$_2$SiH, (t-Bu)$_2$SiH$_2$, (2-cyano-2-propyl)$_2$SiH$_2$, (3-methyl-3oxetanyl)$_2$SiH$_2$, PhMeSiH$_2$, PhMe$_2$SiH, BnMe$_2$SiH, (EtO)$_3$SiH, Me$_2$(pyridinyl)SiH, (i-Pr)$_2$(pyridinyl)SiH, or Me$_3$Si—SiMe$_2$H.

Polymeric silanes, such as polymethylhydrosiloxane (PMHS), are also effective.

Figure 5A:
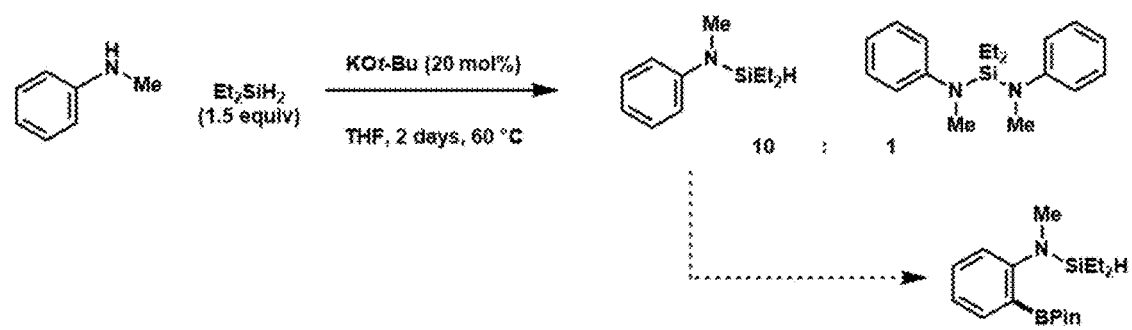
FIG. 5A shows the ability of an exemplary silylated aniline to be used in the preparation of an ortho-BPin (4,4,5,5-tetramethyl-1,3,2-dioxaborolane) moiety, providing access to general borylation of this position.
Figure 5B:
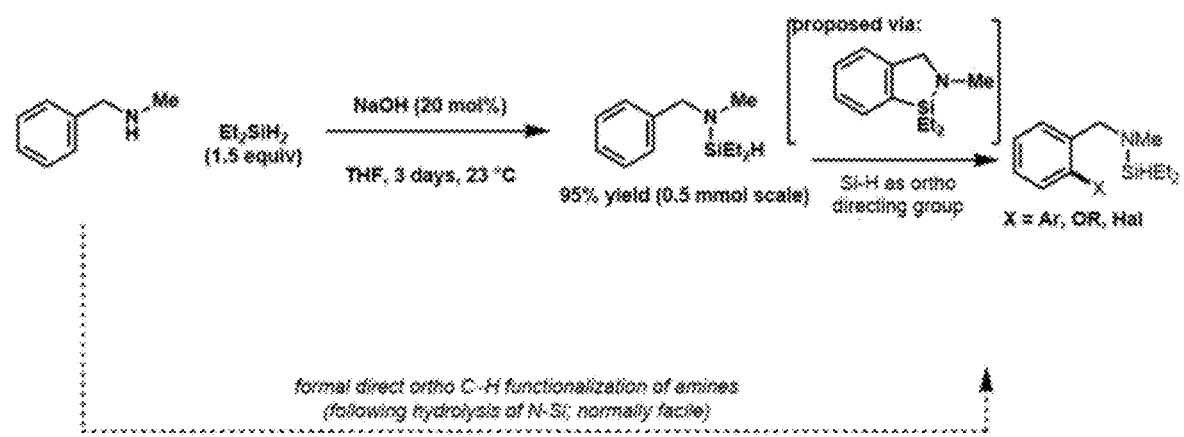
FIG. 5B shows the ability of an exemplary silylated benzylamine to be used in the preparation of several other ortho-substituted derivatives.

The use of organosilanes of general structure (R)$_2$SiH$_2$ and (R)SiH$_3$ also work well and provide for opportunities for coupling or bridging reactions, as described herein. See, e.g., FIGS. 1 and 5A/B.

Previously, some of the inventors reported the use of potassium alkoxide and hydroxide catalysts to effect the silylation of aromatic and heteroaromatic substrates by dehydrogenative coupling of C—H and Si—H bonds, and similar activities are seen in the present systems. In certain embodiments, the at least one hydroxide or alkoxide comprises alkali metal or alkaline earth metal alkoxides or hydroxides, though in preferred embodiments, the at least one hydroxide or alkoxide comprises sodium hydroxide, potassium hydroxide, a sodium alkoxide, or a potassium alkoxide. While both sodium and potassium hydroxides and alkoxides are seen as effective, for reasons not yet understood, potassium hydroxides and alkoxides appear to be preferred. While the nature of the alkoxide is not seen as particularly limiting (including for example any C$_{1-12}$ alkyl alkoxide), potassium tert-butoxide is seen as especially preferred.

The alkoxide or hydroxide catalysts are effective as provided, and do not require any particular activation to operate the methods. While the use of crown ethers or cryptands may, in some cases, be used, in preferred embodiments, the reactions are conducted in mixtures that are free of crown ether or cryptand.

The inventive concepts have been thus far described in terms of the methods of catalytically silylating aromatic-substituted N—H bonds. It should be appreciated that the products obtained or obtainable from such methods, to the extent that they are not practically available by other means known at the time of this filing, and the systems used in these methods, are all considered within the scope of the present disclosure. The distinction between "obtained" and "obtainable from" (or derived/derivable from or prepared/preparable from) the inventive methods is intended to connote that any novel silylated composition is not seen as necessarily limited its method of making and may ultimately be available through other means.

Again, the present disclosure also includes embodiments for any system necessary to affect any of the methods described herein or composition associated with these methods. For example, certain embodiments provide compositions useful for silylating an organic substrate comprising an aromatic-substituted N—H bond, each composition comprising or consisting essentially of a mixture of (a) at least one organosilane and (b) an alkoxide, hydroxide, or hydride (including e.g., sodium or potassium alkoxide or hydroxide, or a mixture thereof), and (c) at least one appropriate substrate, as described herein. Such systems typically include the substrate(s) upon which the system is operable, the substrates comprising at least one aromatic N—H moiety. In other embodiments, these compositions may further comprise at least one product of the silylation reaction; i.e., where the N—H bond of the substrate is replaced by a silyl group corresponding to the silylating agent. As described elsewhere herein, typically, the system is substantially free of transition-metal compounds, or where present, the transition metal may be considered a spectator to the reaction.

Further Observations

The selectivity of these reactions to form the corresponding silylated derivatives of Formulae (IA) and (IIA) (where [Si] represents the corresponding silyl group) is noteworthy when compared with other analogous substrates:

Compare, for example, the reactions shown in FIG. 1 for methyl aniline with those previously published for the corresponding to methoxybenzenes and thioanisole (as described in U.S. Pat. No. 9,809,607, Examples 6.7.4 and 6.7.5). Under comparable reaction conditions, contrasting its O and S analogs, the methyl aniline produced no evidence for the silylation of either the pendant methyl or aromatic groups.

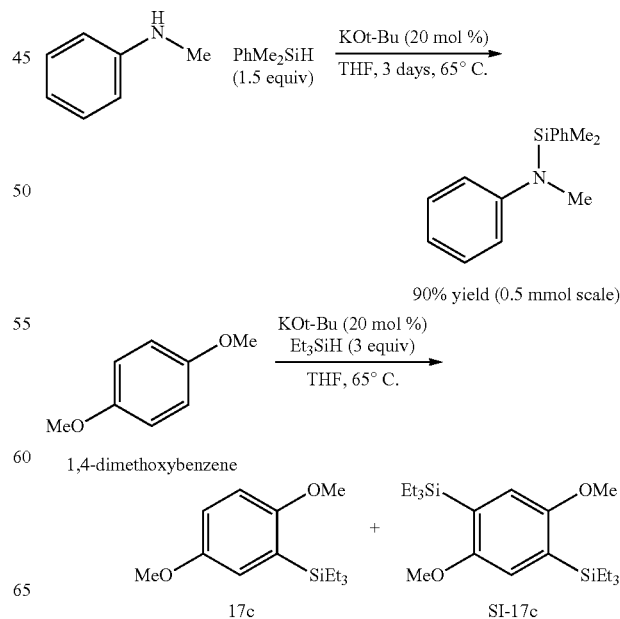

-continued

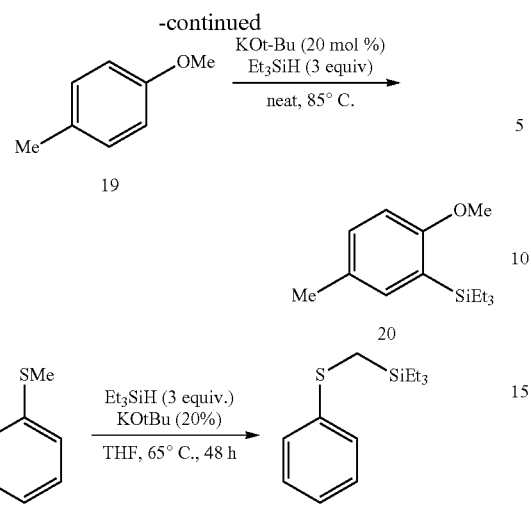

19

20

Downstream Reactions

The methods described herein may be further used in combination with previously established reaction schemes to effect a number of additional novel transformations and products.

Borylation: For example, as exemplified in FIG. 5A, the silylation of these amines using dihydrosilanes may be used to provide a means for borylating the position ortho to the amine nitrogen. Following (and including) the initial placement of the BPin substituent, using methods described, for example, in Boebel, T., et al., "Silyl-Directed, Iridium-Catalyzed ortho-Borylation of Arenes. A One-Pot ortho-Borylation of Phenols, Arylamines, and Alkylarenes," *J. Am. Chem. Soc.*, 2008, 130 (24), pp 7534-7535 (the contents of which are incorporated by reference herein in its entirety, or at least for its teaching of the reaction conditions useful for effecting these transformations), it is possible to hydrolyze the BPin borate ester to the corresponding boronic. Again, while exemplified in FIG. 5A as using the phenyl amine derivative, it should be appreciated that this transformation would also be applicable for any of the aromatic-substituted amino derivatives deriving from the compounds of Formulae (I)/(IA):

$$R^1\diagdown N \diagup H \mid R^2 \quad (I)$$

$$R^1\diagdown N \diagup [Si] \mid R^2 \quad (IA)$$

where $R^1$ and $R^2$ are described elsewhere herein.

Ortho-directing benzyl amines. Likewise, other groups have also discussed the ability to develop a range of ortho-derivatized products from (hydrido)silyl amines, for example in Li, et al., *Angew. Chem. Int.* 2014, 53(32), pp. 8471-8474 (the contents of which are incorporated by reference herein in its entirety, or at least for its teaching of the reaction conditions useful for effecting these transformations). These downstream methods may be used in tandem with the present methods disclosed herein, and as such represent additional embodiments of the present disclosure.

Imaging agents. The hydrodialkylaminosilanes (e.g., compounds of Formula (IA) and (IIA) derived from dihydrosilanes, also provide attractive precursors for the preparation of radiolabeled $^{19}F$ imaging agents, for example:

where [Si] is —$(R^B)_2Si$—H, $R^1$ and $R^2$ are described elsewhere herein, and $R^B$ represent a bulky alkyl group, such as di-tert-butyl, or a isostere thereof (e.g., where t-Bu is replace by 2-cyano-2-propyl or 3-methyl-3-oxetanyl). The conversion of these materials to the radiolabeled $^{18}F$ derivatives involves the use of known chemistry (i.e., including the use of KF/crown ether systems) and the methods used to prepare these derivatives, when used in combination of the novel methods described herein, as well as the novel imaging agents derived or derivable from these hybrid methods, are considered to be within the scope of the present disclosure. Scheme 1 provides an exemplar of this discussion.

Scheme 1

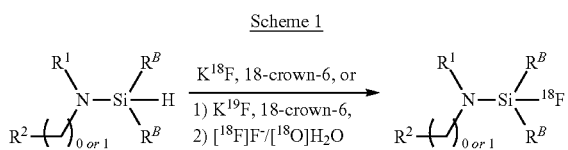

Note that while $R^1$ and $R^2$ are defined elsewhere herein, these groups can be functionalized even beyond the descriptions for these, for example where either $R^1$ or $R^2$ or both contain hydrophilic pendants (including e.g., at least one polyglycol and/or (oligo/poly)peptide linkage).

Other methods for converting the Si—H bond to an optionally radiolabeled Si—F bond are also available, for example, via an Si—X intermediate (where X=halo, alkoxy, or hydroxy) and considered within the scope of the present disclosure. That is, the methods disclosed herein, in further combination with known methods for converting Si—H to Si—Cl, Si-alkoxide, and Si—OH are considered further embodiments of the present invention/disclosure. See, e.g., Kunai, et al. *Organometallics* 1992, 11, 2708-2711 (for converting Si—H to Si—Cl bonds) and Wangler, et al., *Applied Sciences*, 2012, 2, 277-302 (for converting Si—X to Si—F), both of which are incorporated by reference herein in their entireties, or at least for their teachings of the methods for affecting these transformations.

Terms

In the present disclosure the singular forms "a," "an," and "the" include the plural reference, and reference to a particular numerical value includes at least that particular value, unless the context clearly indicates otherwise. Thus, for example, a reference to "a" hydrosilane is a reference to at least one, and optionally two or more hydrosilanes such as described herein.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others.

The transitional terms "comprising," "consisting essentially of," and "consisting" are intended to connote their generally in accepted meanings in the patent vernacular; that is, (i) "comprising," which is synonymous with "including," "containing," or "characterized by," is inclusive or open-ended and does not exclude additional, unrecited elements or method steps; (ii) "consisting of" excludes any element, step, or ingredient not specified in the claim; and (iii) "consisting essentially of" limits the scope of a claim to the specified materials or steps "and those that do not materially affect the basic and novel characteristic(s)" of the claimed invention. Embodiments described in terms of the phrase "comprising" (or its equivalents), also provide, as embodiments, those that are independently described in terms of "consisting of" and "consisting essentially of" For those embodiments provided in terms of "consisting essentially of," the basic and novel characteristic(s) is the facile operability of the methods to provide silylated products at meaningful yields (or the ability of the systems used in such methods to provide the product compositions at meaningful yields or the compositions derived therefrom) to silylate aromatic amine N—H moieties using only those ingredients listed. In those embodiments that provide a system or method comprises the use of a mixture consisting essentially of the substrate, hydrosilane or hydrosiloxane, and strong base (sodium or potassium hydroxide, alkoxide, or hydride), it refers to the fact that this system operates to silylate the substrate at rates corresponding to those described herein under comparable conditions as described herein without additional (e.g., transition metal) catalysts or plasma or UV radiation sources. While some level of transition metals may be present (for example, as a substrate), they are not needed for the operability of the methods and may be considered spectators for purposes of this reaction. Indeed, extensive experiments and analyses conducted rule out catalysis by adventitious transition metal residues. Similarly, while other previous silylation reactions have employed plasma or UV irradiation to operate, the present invention does not require these energy sources. The additional presence of these energy sources should not be seen as replacing the basis underlying operability of the present methods. The term "meaningful product yields" is intended to reflect product yields of greater than 50%, but when specified, this term may also refer to yields of 10%, 20%, 30%, 40%, 50%, 60%, 70%, 80%, or 90% or more, relative to the amount of original substrate.

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C." Similarly, a designation such as $C_{1-3}$ includes $C_1$, $C_2$, $C_3$, $C_{1-2}$, $C_{2-3}$, $C_{1,3}$, as separate embodiments, as well as $C_{1-3}$.

Throughout this specification, words are to be afforded their normal meaning, as would be understood by those skilled in the relevant art. However, so as to avoid misunderstanding, the meanings of certain terms will be specifically defined or clarified.

The term "alkyl" as used herein refers to a linear, branched, or cyclic saturated hydrocarbon group typically although not necessarily containing 1 to about 24 carbon atoms, preferably 1 to about 12 carbon atoms, such as methyl, ethyl, n-propyl, isopropyl, n-butyl, isobutyl, tert-butyl, octyl, decyl, and the like, as well as cycloalkyl groups such as cyclopentyl, cyclohexyl and the like. Generally, although again not necessarily, alkyl groups herein contain 1 to about 12 carbon atoms. The term "lower alkyl" intends an alkyl group of 1 to 6 carbon atoms, and the specific term "cycloalkyl" intends a cyclic alkyl group, typically having 4 to 8, preferably 5 to 7, carbon atoms. The term "substituted alkyl" refers to alkyl groups substituted with one or more substituent groups, and the terms "heteroatom-containing alkyl" and "heteroalkyl" refer to alkyl groups in which at least one carbon atom is replaced with a heteroatom. If not otherwise indicated, the terms "alkyl" and "lower alkyl" include linear, branched, cyclic, unsubstituted, substituted, and/or heteroatom-containing alkyl and lower alkyl groups, respectively. The term "bulky alkyl" or "bulky heteroalkyl" typically refers to tertiary carbon groups, e.g., —CR'3, where R' is independently $C_{1-6}$ alkyl or heteroalkyl, such as tert-butyl, 2-methyl-2-butyl, 2-methyl-3-pentyl and isosteres thereof (e.g., 2-cyano-2-propyl or 3-methyl-3oxetanyl).

The term "alkylene" as used herein refers to a difunctional linear, branched, or cyclic alkyl group, where "alkyl" is as defined above.

The term "alkenyl" as used herein refers to a linear, branched, or cyclic hydrocarbon group of 2 to about 24 carbon atoms containing at least one double bond, such as ethenyl, n-propenyl, isopropenyl, n-butenyl, isobutenyl, octenyl, decenyl, tetradecenyl, hexadecenyl, eicosenyl, tetracosenyl, and the like. Preferred alkenyl groups herein contain 2 to about 12 carbon atoms. The term "lower alkenyl" intends an alkenyl group of 2 to 6 carbon atoms, and the specific term "cycloalkenyl" intends a cyclic alkenyl group, preferably having 5 to 8 carbon atoms. The term "substituted alkenyl" refers to alkenyl groups substituted with one or more substituent groups, and the terms "heteroatom-containing alkenyl" and "heteroalkenyl" refer to alkenyl groups in which at least one carbon atom is replaced with a heteroatom. If not otherwise indicated, the terms "alkenyl" and "lower alkenyl" include linear, branched, cyclic, unsubstituted, substituted, and/or heteroatom-containing alkenyl and lower alkenyl groups, respectively.

The term "alkenylene" as used herein refers to a difunctional linear, branched, or cyclic alkenyl group, where "alkenyl" is as defined above.

The term "alkynyl" as used herein refers to a linear or branched hydrocarbon group of 2 to about 24 carbon atoms containing at least one triple bond, such as ethynyl, n-propynyl, and the like. Preferred alkynyl groups herein contain 2 to about 12 carbon atoms. The term "lower alkynyl" intends an alkynyl group of 2 to 6 carbon atoms. The term "substituted alkynyl" refers to an alkynyl group substituted with one or more substituent groups, and the terms "heteroatom-containing alkynyl" and "heteroalkynyl" refer to alkynyl in which at least one carbon atom is replaced with a heteroatom. If not otherwise indicated, the terms "alkynyl" and "lower alkynyl" include a linear, branched, unsubstituted, substituted, and/or heteroatom-containing alkynyl and lower alkynyl group, respectively.

The term "alkoxy" as used herein intends an alkyl group bound through a single, terminal ether linkage; that is, an "alkoxy" group may be represented as —O-alkyl where alkyl is as defined above. A "lower alkoxy" group intends an alkoxy group containing 1 to 6 carbon atoms. Analogously, "alkenyloxy" and "lower alkenyloxy" respectively refer to an alkenyl and lower alkenyl group bound through a single, terminal ether linkage, and "alkynyloxy" and "lower alkynyloxy" respectively refer to an alkynyl and lower alkynyl group bound through a single, terminal ether linkage.

The term "aromatic" refers to the ring moieties which satisfy the Hückel 4n+2 rule for aromaticity, and includes both aryl (i.e., carbocyclic, including aryl, aralkyl, alkaryl) and heteroaryl (also called heteroaromatic, including heteroaryl, heteroaralkyl, or alk-heteroaryl) moieties, or prepolymeric (e.g., monomeric, dimeric), oligomeric or polymeric analogs thereof.

The term "aromatic-substituted N—H bond" refers to an N—H bond of an amine containing a pendant aromatic group. As described herein, the nitrogen containing the N—H bond is exocyclic to the aromatic ring, either adjacently (as in Formula (I)) or separated by a methylene bridge (as in Formula (II)). In the case of the compounds of Formula (I), as discussed elsewhere herein, the amine nitrogen is distinguishable from other aliphatic amines in that the nitrogen electrons of the former are delocalized into the aromatic ring moiety, for example as in:

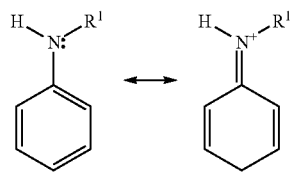

where $R^1$ is described elsewhere, and the phenyl group is but one exemplary of the aromatic group $R^2$, again described elsewhere.

The term "aryl" as used herein, and unless otherwise specified, refers to an aromatic substituent or structure containing a single aromatic ring or multiple aromatic rings that are fused together (e.g., naphthyl), directly linked (such as biphenyl), or indirectly linked (such that the different aromatic rings are bound to a common group such as a methylene or ethylene or oxo moiety as in diphenylmethane). Unless otherwise modified, the term "aryl" refers to carbocyclic structures. Preferred aryl groups contain 6 to 24 carbon atoms, and particularly preferred aryl groups contain 6 to 14 carbon atoms. Exemplary aryl groups contain one aromatic ring or two fused or linked aromatic rings, e.g., phenyl, naphthyl, biphenyl, diphenylether, diphenylamine, benzophenone, and the like. "Substituted aryl" refers to an aryl moiety substituted with one or more substituent groups, and the terms "heteroatom-containing aryl" and "heteroaryl" refer to aryl substituents in which at least one carbon atom is replaced with a heteroatom, as will be described in further detail elsewhere herein.

The term "aryloxy" as used herein refers to an aryl group bound through a single, terminal ether linkage, wherein "aryl" is as defined above. An "aryloxy" group may be represented as —O-aryl where aryl is as defined above. Preferred aryloxy groups contain 5 to 24 carbon atoms, and particularly preferred aryloxy groups contain 5 to 14 carbon atoms. Examples of aryloxy groups include, without limitation, phenoxy, o-halo-phenoxy, m-halo-phenoxy, p-halophenoxy, o-methoxy-phenoxy, m-methoxy-phenoxy, p-methoxy-phenoxy, 2,4-dimethoxy-phenoxy, 3,4,5-trimethoxy-phenoxy, and the like.

The term "alkaryl" refers to an aryl group with an alkyl substituent, and the term "aralkyl" refers to an alkyl group with an aryl substituent, wherein "aryl" and "alkyl" are as defined above. Preferred alkaryl and aralkyl groups contain 6 to 24 carbon atoms, and particularly preferred alkaryl and aralkyl groups contain 6 to 16 carbon atoms. Alkaryl groups include, for example, p-methylphenyl, 2,4-dimethylphenyl, p-cyclohexylphenyl, 2,7-dimethylnaphthyl, 7-cyclooctylnaphthyl, 3-ethyl-cyclopenta-1,4-diene, and the like. Examples of aralkyl groups include, without limitation, benzyl, 2-phenyl-ethyl, 3-phenyl-propyl, 4-phenyl-butyl, 5-phenyl-pentyl, 4-phenylcyclohexyl, 4-benzylcyclohexyl, 4-phenylcyclohexylmethyl, 4-benzylcyclohexylmethyl, and the like. The terms "alkaryloxy" and "aralkyloxy" refer to substituents of the formula —OR wherein R is alkaryl or aralkyl, respectively, as just defined.

The term "acyl" refers to substituents having the formula —(CO)-alkyl, —(CO)-aryl, or —(CO)-aralkyl, and the term "acyloxy" refers to substituents having the formula —O(CO)-alkyl, —O(CO)-aryl, or —O(CO)-aralkyl, wherein "alkyl," "aryl, and "aralkyl" are as defined above.

The terms "cyclic" and "ring" refer to alicyclic or aromatic groups that may or may not be substituted and/or heteroatom-containing, and that may be monocyclic, bicyclic, or polycyclic. The term "alicyclic" is used in the conventional sense to refer to an aliphatic cyclic moiety, as opposed to an aromatic cyclic moiety, and may be monocyclic, bicyclic, or polycyclic. The term "acyclic" refers to a structure in which the double bond is not contained within a ring structure.

The terms "halo," "halide," and "halogen" are used in the conventional sense to refer to a chloro, bromo, fluoro, or iodo substituent.

"Hydrocarbyl" refers to univalent hydrocarbyl radicals containing 1 to about 30 carbon atoms, preferably 1 to about 24 carbon atoms, most preferably 1 to about 12 carbon atoms, including linear, branched, cyclic, saturated, and unsaturated species, such as alkyl groups, alkenyl groups, aryl groups, and the like. The term "lower hydrocarbyl" intends a hydrocarbyl group of 1 to 6 carbon atoms, preferably 1 to 4 carbon atoms, and the term "hydrocarbylene" intends a divalent hydrocarbyl moiety containing 1 to about 30 carbon atoms, preferably 1 to about 24 carbon atoms, most preferably 1 to about 12 carbon atoms, including linear, branched, cyclic, saturated and unsaturated species. The term "lower hydrocarbylene" intends a hydrocarbylene group of 1 to 6 carbon atoms. "Substituted hydrocarbyl" refers to hydrocarbyl substituted with one or more substituent groups, and the terms "heteroatom-containing hydrocarbyl" and "heterohydrocarbyl" refer to hydrocarbyl in which at least one carbon atom is replaced with a heteroatom. Similarly, "substituted hydrocarbylene" refers to hydrocarbylene substituted with one or more substituent groups, and the terms "heteroatom-containing hydrocarbylene" and "heterohydrocarbylene" refer to hydrocarbylene in which at least one carbon atom is replaced with a heteroatom. Unless otherwise indicated, the term "hydrocarbyl" and "hydrocarbylene" are to be interpreted as including substituted and/or heteroatom-containing hydrocarbyl and hydrocarbylene moieties, respectively.

The term "heteroatom-containing" as in a "heteroatom-containing hydrocarbyl group" refers to a hydrocarbon molecule or a hydrocarbyl molecular fragment in which one or more carbon atoms is replaced with an atom other than carbon, e.g., nitrogen, oxygen, sulfur, phosphorus or silicon, typically nitrogen, oxygen or sulfur. Similarly, the term "heteroalkyl" refers to an alkyl substituent that is heteroatom-containing, the term "heterocyclic" refers to a cyclic substituent that is heteroatom-containing, the terms "heteroaryl" and heteroaromatic" respectively refer to "aryl" and "aromatic" substituents that are heteroatom-containing, and the like. It should be noted that a "heterocyclic" group or compound may or may not be aromatic, and further that "heterocycles" may be monocyclic, bicyclic, or polycyclic as described above with respect to the term "aryl." Examples of heteroalkyl groups include alkoxyaryl, alkylsulfanyl-substituted alkyl, N-alkylated amino alkyl, and the like. Non-limiting examples of heteroaryl substituents include pyrrolyl, pyrrolidinyl, pyridinyl, quinolinyl, indolyl, pyrimidinyl, imidazolyl, 1,2,4-triazolyl, tetrazolyl, etc., and examples of heteroatom-containing alicyclic groups are pyrrolidino, morpholino, piperazino, piperidino, etc.

As used herein, the terms "substrate" or "organic substrate" are intended to connote both discrete small molecules (sometimes described as "organic compounds") and oligomers and polymers containing such aromatic-substituted amines; i.e., in the latter case, where the compounds, prepolymers (i.e., monomeric compounds capable of polymerizing), oligomers, or polymers having at least one of the indicated structure. Where shown as structures, the moieties contain at least that which is shown, as well as containing further functionalization, substituents, or both, including but not limited to the functionalization described as "Fn" herein.

By "substituted" as in "substituted hydrocarbyl," "substituted alkyl," "substituted aryl," and the like, as alluded to in some of the aforementioned definitions, is meant that in the hydrocarbyl, alkyl, aryl, heteroaryl, or other moiety, at least one hydrogen atom bound to a carbon (or other) atom is replaced with one or more non-hydrogen substituents. Examples of such substituents include, without limitation: functional groups referred to herein as "Fn," such as halo (e.g., F, $C_1$, Br, I), hydroxyl, sulfhydryl, $C_1$-$C_{24}$ alkoxy, $C_2$-$C_{24}$ alkenyloxy, $C_2$-$C_{24}$ alkynyloxy, $C_5$-$C_{24}$ aryloxy, $C_6$-$C_{24}$ aralkyloxy, $C_6$-$C_{24}$ alkaryloxy, acyl (including $C_1$-$C_{24}$ alkylcarbonyl (—CO-alkyl) and $C_6$-$C_{24}$ arylcarbonyl (—CO-aryl)), acyloxy (—O-acyl, including $C_2$-$C_{24}$alkylcarbonyloxy (—O—(CO)—O-alkyl) and $C_6$-$C_{24}$ arylcarbonyloxy (—O—(CO)-aryl)), $C_2$-$C_{24}$ alkoxycarbonyl ((CO)—O-alkyl), $C_6$-$C_{24}$ aryloxycarbonyl (—(CO)—O-aryl), halocarbonyl (—CO)—X where X is halo), $C_2$-$C_{24}$ alkylcarbonato (—O—(CO)—O-alkyl), $C_6$-$C_{24}$ arylcarbonato (—O—(CO)—O-aryl), carboxy (—COOH), carboxylato (—COO—), carbamoyl (—(CO)—NH$_2$), mono-($C_1$-$C_{24}$ alkyl)-substituted carbamoyl (—(CO)NH($C_1$-$C_{24}$ alkyl)), di-($C_1$-$C_{24}$ alkyl)-substituted carbamoyl (—(CO)—N($C_1$-$C_{24}$ alkyl)$_2$), mono-($C_1$-$C_{24}$ haloalkyl)-substituted carbamoyl (—(CO)—NH($C_1$-$C_{24}$ alkyl)), di-($C_1$-$C_{24}$ haloalkyl)-substituted carbamoyl (—(CO)—N($C_1$-$C_{24}$ alkyl)$_2$), mono-($C_5$-$C_{24}$ aryl)-substituted carbamoyl (—(CO)—NH-aryl), di-($C_5$-$C_{24}$ aryl)substituted carbamoyl (—(CO)—N($C_5$-$C_{24}$ aryl)$_2$), di-N—($C_1$-$C_{24}$ alkyl), N—($C_5$-$C_{24}$ aryl)-substituted carbamoyl, thiocarbamoyl (—(CS)—NH$_2$), mono-($C_1$-$C_{24}$ alkyl)-substituted thiocarbamoyl (—(CO)—NH($C_1$-$C_{24}$ alkyl)), di-($C_1$-$C_{24}$ alkyl)-substituted thiocarbamoyl (—(CO)—N($C_1$-$C_{24}$ alkyl)$_2$), mono-($C_5$-$C_{24}$ aryl) substituted thiocarbamoyl (—(CO)—NH-aryl), di-($C_5$-$C_{24}$ aryl)-substituted thiocarbamoyl (—(CO)—N($C_5$-$C_{24}$ aryl)$_2$), di-N—($C_1$-$C_{24}$ alkyl), N—($C_5$-$C_{24}$ aryl)-substituted thiocarbamoyl, carbamido (—NH—(CO)—NH$_2$), cyano(—C≡N), cyanato (—O—C≡N), thiocyanato (—S—C≡N), formyl (—(CO)—H), thioformyl (—(CS)—H), amino (—NH$_2$), mono-($C_1$-$C_{24}$ alkyl)-substituted amino, di-($C_1$-$C_{24}$ alkyl)-substituted amino, mono-($C_5$-$C_{24}$ aryl)substituted amino, di-($C_5$-$C_{24}$ aryl)-substituted amino, $C_1$-$C_{24}$ alkylamido (—NH—(CO)-alkyl), $C_6$-$C_{24}$ arylamido (—NH—(CO)-aryl), imino (—CR=NH where R=hydrogen, $C_1$-$C_{24}$ alkyl, $C_5$-$C_{24}$ aryl, $C_6$-$C_{24}$ alkaryl, $C_6$-$C_{24}$ aralkyl, etc.), $C_2$-$C_{20}$ alkylimino (—CR=N(alkyl), where R=hydrogen, $C_1$-$C_{24}$ alkyl, $C_5$-$C_{24}$ aryl, $C_6$-$C_{24}$ alkaryl, $C_6$-$C_{24}$ aralkyl, etc.), arylimino (—CR=N(aryl), where R=hydrogen, $C_1$-$C_{20}$ alkyl, $C_5$-$C_{24}$ aryl, $C_6$-$C_{24}$ alkaryl, $C_6$-$C_{24}$ aralkyl, etc.), nitro (—NO$_2$), nitroso (—NO), sulfo (—SO$_2$OH), sulfonate (SO$_2$O—), $C_1$-$C_{24}$ alkylsulfanyl (—S-alkyl; also termed "alkylthio"), $C_5$-$C_{24}$ arylsulfanyl (—S-aryl; also termed "arylthio"), $C_1$-$C_{24}$ alkylsulfinyl (—(SO)-alkyl), $C_5$-$C_{24}$ arylsulfinyl (—(SO)-aryl), $C_1$-$C_{24}$ alkylsulfonyl (—SO$_2$-alkyl), $C_5$-$C_{24}$ monoalkylaminosulfonyl-SO$_2$—N(H) alkyl), $C_1$-$C_{24}$ dialkylaminosulfonyl-SO$_2$—N(alkyl)$_2$, $C_5$-$C_{24}$ arylsulfonyl (—SO$_2$-aryl), boryl (—BH$_2$), borono (—B(OH)$_2$), boronato (—B(OR)$_2$ where R is alkyl or other hydrocarbyl), phosphono (—P(O)(OH)$_2$), phosphonato (—P(O)(O)$_2$), phosphinato (P(O)(O—)), phospho (—PO$_2$), and phosphine (—PH$_2$); and the hydrocarbyl moieties $C_1$-$C_{24}$ alkyl (preferably $C_1$-$C_{12}$ alkyl, more preferably $C_1$-$C_6$ alkyl), $C_2$-$C_{24}$ alkenyl (preferably $C_2$-$C_{12}$ alkenyl, more preferably $C_2$-$C_6$ alkenyl), $C_2$-$C_{24}$ alkynyl (preferably $C_2$-$C_{12}$ alkynyl, more preferably $C_2$-$C_6$ alkynyl), $C_5$-$C_{24}$ aryl (preferably $C_5$-$C_{24}$ aryl), $C_6$-$C_{24}$ alkaryl (preferably $C_6$-$C_{16}$ alkaryl), and $C_6$-$C_{24}$ aralkyl (preferably $C_6$-$C_{16}$ aralkyl). Within these substituent structures, the "alkyl," "alkylene," "alkenyl," "alkenylene," "alkynyl," "alkynylene," "alkoxy," "aromatic," "aryl," "aryloxy," "alkaryl," and "aralkyl" moieties may be optionally fluorinated or perfluorinated. Additionally, reference to alcohols, aldehydes, amines, carboxylic acids, ketones, or other similarly reactive functional groups also includes their protected analogs. For example, reference to hydroxy or alcohol also includes those substituents wherein the hydroxy is protected by acetyl (Ac), benzoyl (Bz), benzyl (Bn, Bnl), β-Methoxyethoxymethyl ether (MEM), dimethoxytrityl, [bis-(4-methoxyphenyl)phenylmethyl](DMT), methoxymethyl ether (MOM), methoxytrityl [(4-methoxyphenyl)diphenylmethyl, MMT), p-methoxybenzyl ether (PMB), methylthiomethyl ether, pivaloyl (Piv), tetrahydropyranyl (THP), tetrahydrofuran (THF), trityl (triphenylmethyl, Tr), silyl ether (most popular ones include trimethylsilyl (TMS), tert-butyldimethylsilyl (TBDMS), tri-iso-propylsilyloxymethyl (TOM), and triisopropylsilyl (TIPS) ethers), ethoxyethyl ethers (EE). Reference to amines also includes those substituents wherein the amine is protected by a BOC glycine, carbobenzyloxy (Cbz), p-methoxybenzyl carbonyl (Moz or MeOZ), tert-butyloxycarbonyl (BOC), 9-fluorenylmethyloxycarbonyl (FMOC), acetyl (Ac), benzoyl (Bz), benzyl (Bn), carbamate, p-methoxybenzyl (PMB), 3,4-dimethoxybenzyl (DMPM), p-methoxyphenyl (PMP), tosyl (Ts) group, or sulfonamide (Nosyl & Nps) group. Reference to substituent containing a carbonyl group also includes those substituents wherein the carbonyl is protected by an acetal or ketal, acylal, or diathane group. Reference to substituent containing a carboxylic acid or carboxylate group also includes those substituents wherein the carboxylic acid or carboxylate group is protected by its methyl ester, benzyl ester, tert-butyl ester, an ester of 2,6-disubstituted phenol (e.g. 2,6-dimethylphenol, 2,6-diisopropylphenol, 2,6-di-tert-butylphenol), a silyl ester, an orthoester, or an oxazoline. Preferred substituents are those identified herein as not or less affecting the silylation chemistries, for example, including those substituents comprising alkyls; alkoxides, aryloxides, aralkylalkoxides, protected carbonyl groups; aryls optionally substituted with F, Cl, —$CF_3$; epoxides; N-alkyl aziridines; cis- and trans-olefins; acetylenes; pyridines, primary, secondary and tertiary amines; phosphines; and hydroxides.

By "functionalized" as in "functionalized hydrocarbyl," "functionalized alkyl," "functionalized olefin," "functionalized cyclic olefin," and the like, is meant that in the hydrocarbyl, alkyl, aryl, heteroaryl, olefin, cyclic olefin, or other moiety, at least one hydrogen atom bound to a carbon (or other) atom is replaced with one or more functional groups such as those described herein and above. The term "functional group" is meant to include any functional species that is suitable for the uses described herein. In particular, as used herein, a functional group would necessarily possess the ability to react with or bond to corresponding functional groups on a substrate surface.

In addition, the aforementioned functional groups may, if a particular group permits, be further substituted with one or more additional functional groups or with one or more hydrocarbyl moieties such as those specifically enumerated above. Analogously, the above-mentioned hydrocarbyl moieties may be further substituted with one or more functional groups or additional hydrocarbyl moieties such as those specifically enumerated.

"Optional" or "optionally" means that the subsequently described circumstance may or may not occur, so that the description includes instances where the circumstance occurs and instances where it does not. For example, the phrase "optionally substituted" means that a non-hydrogen substituent may or may not be present on a given atom, and, thus, the description includes structures wherein a non-hydrogen substituent is present and structures wherein a non-hydrogen substituent is not present (i.e., the position is occupied by H).

As used herein, the term "silylating" refers to the dehydrogenative coupling of a Si—H bond with another hydrogen bond of a substrate. Unless otherwise described herein, in the present disclosure this results in the forming of nitrogen-silicon bonds, generally in a position previously occupied by the nitrogen-hydrogen bond of the aromatic-substituted amine, as described herein. In such cases, silylating may be seen as coupling of a N—H and Si—H bond to form a N—Si bond. The ability to replace directly a N—H bond with a N—Si bond, under the conditions described herein, is believed to be unprecedented.

As used herein, the term "substantially free of a transition-metal compound" is intended to reflect that the system is effective for its intended purpose of silylating aromatic-substituted amine N—H bonds under the relatively mild conditions described herein, even in the absence of any exogenous (i.e., deliberately added or otherwise) transition-metal catalyst(s). While certain embodiments provide that transition metals or transition metal species, including those capable of catalyzing silylation reactions, may be present within the systems or methods described herein at levels normally associated with such catalytic activity (for example, in the case where the substrates comprise metallocenes), the presence of such metals (either as catalysts or spectator compounds) is not required and in many cases is not desirable. As such, in preferred embodiments, the system and methods are "substantially free of transition-metal compounds." Unless otherwise stated, then, the term "substantially free of a transition-metal compound" is defined to reflect that the total level of transition metal within the silylating system, independently or in the presence of organic substrate, is less than about 5 ppm, as measured by ICP-MS. When expressly stated as such, additional embodiments also provide that the concentration of transition metals is less than about 10 wt %, 5 wt %, 1 wt %, 100 ppm, 50 ppm, 30 ppm, 25 ppm, 20 ppm, 15 ppm, 10 ppm, or 5 ppm to about 1 ppm or 0 ppm. As used herein, the term "transition metal" is defined to include d-block elements, for example Ag, Au, Co, Cr, Rh, Ir, Fe, Ru, Os, Ni, Pd, Pt, Cu, Zn, or combinations thereof. In further specific independent embodiments, the concentration of Ni, as measured by ICP-MS, is less than 25 ppm, less than 10 ppm, less than 5 ppm, or less than 1 ppm.

While it may not be necessary to limit the system's exposure to water and oxygen, in some embodiments, the chemical systems and the methods are done in an environment substantially free of water, oxygen, or both water and oxygen. In other embodiments, air and/or water are present. Unless otherwise specified, the term "substantially free of water" refers to levels of water less than about 500 ppm and "substantially free of oxygen" refers to oxygen levels corresponding to partial pressures less than 1 torr. Where stated, additional independent embodiments may provide that "substantially free of water" refers to levels of water less than 1.5%, 1%, 0.5%, 1000 ppm, 500 ppm, 250 ppm, 100 ppm, 50 ppm, 10 ppm, or 1 ppm and "substantially free of oxygen" refers to oxygen levels corresponding to partial pressures less than 50 torr, 10 torr, 5 torr, 1 torr, 500 millitorr, 250 millitorr, 100 millitorr, 50 millitorr, or 10 millitorr.

The following listing of Embodiments is intended to complement, rather than displace or supersede, the previous descriptions.

Embodiment 1. A method of forming an N—Si silyl bond, the method comprising or consisting essentially of contacting an organic substrate comprising an aromatic-substituted amine having at least one N—H bond with a mixture comprising of (a) at least one hydrosilane or hydrosiloxane and (b) at least one hydroxide or alkoxide, under conditions sufficient to form the N—Si bond.

In some Aspects of this Embodiment, the conditions sufficient to form the N—Si bond result in the formation of the N—Si bond.

In some Aspects of this Embodiment, the mixture is free of added solvent. In other Aspects, the mixture further comprises a solvent. In certain of these Aspects, the solvent is or comprises an aprotic oxygen donor solvent. In certain other Aspects, the aprotic oxygen donor solvent is or comprises dimethylacetamide (DMA), dimethyl formamide (DMF), dimethylsulfoxide, 1,2-dimethoxyethane (DME), a dioxane, a dialkyl ether, hexamethylphosphoramide (HMPA), N-methylpyrrolidone, tetrahydrofuran, 2-methyl-tetrahydrofuran, or a mixture thereof.

In some Aspects of this Embodiment, the mixture is substantially free of oxygen.

In some Aspects of this Embodiment, the mixture contains less than 500 ppm water, less than 100 ppm water, less than 50 ppm water, or is substantially free of water.

In some Aspects of this Embodiment, the conditions sufficient to form the N—Si bond includes the use of thermal heating the mixture at a temperature in a range of from 20° C. to about 80° C., preferably to about 65° C. In some Aspects of this Embodiment, the conditions further comprise maintaining the mixture at one or more temperatures in this range for a time defined by a range of from about 2 hours to about 2 weeks, with various subsets of time defined further herein.

Embodiment 2. The method of claim 1, wherein the aromatic-substituted amine having at least one N—H bond comprises a structure of Formulae (I) or (II)

where $R^1$ is H, an optionally substituted alkyl or alkylene, an optionally substituted alkenyl or alkenylene, and optionally substituted alkynyl or alkynylene, an optionally substituted aryl or arylene, an optionally substituted heteroalkyl or heteroalkylene, an optionally substituted heteroaryl or heteroarylene, an optionally substituted aralkyl or aralkylene, an optionally substituted heteroaralkyl or heteroaralkylene, or optionally substituted metallocene; and $R^2$ is an optionally substituted aryl or heteroaryl group.

The compounds of Formulae (I) and (II) are considered independent Aspects of this Embodiment.

Embodiment 3. The method of claim 2, wherein $R^1$ is H.

Embodiment 4. The method of Embodiment 2, wherein $R^1$ is an optionally substituted alkyl, optionally substituted alkenyl, optionally substituted alkynyl, optionally substituted aryl, optionally substituted heteroalkyl, optionally substituted heteroaryl, or optionally substituted aralkyl.

Embodiment 5. The method of Embodiment 2, wherein $R^1$ is linked with $R^2$ to form a cyclic moiety such that $R^1$ is an optionally substituted alkylene, optionally substituted alkenylene, optionally substituted alkynylene, optionally substituted arylene, optionally substituted heteroalkylene, optionally substituted heteroarylene, or optionally substituted aralkylene.

Embodiment 6. The method of Embodiment 1, wherein the aromatic-substituted amine having at least one N—H bond is an optionally substituted aryl-substituted amine.

Embodiment 7. The method of Embodiment 1, wherein the aromatic-substituted amine having at least one N—H bond is an optionally substituted heteroaryl-substituted amine.

Embodiment 8. The method of any one of Embodiments 2 to 5, wherein $R^2$ is an optionally substituted phenyl or naphthyl amine or an optionally substituted pyridinyl or quinolinyl amine.

Embodiment 9. The method of any one of Embodiments 2 to 5, wherein $R^2$ is an optionally substituted furan, pyrrole, thiophene, pyrazole, imidazole, triazole, isoxazole, oxazole, thiazole, isothiazole, oxadiazole, pyridine, bipyridine, terpyridine, pyrrolopyridine, phenantholine, pyridazine, pyrimidine, pyrazine, triazone, benzofuran, benzopyrrole, benzothiophene, isobenzofuran, isobenzopyrrole, isobenzothiophene, indole, isoindole, indolizine, indazole, azaindole, benzisoxazole, benzoxazole, quinoline, isoquinoline, cinnoline, quinazoline, naphthyridine, 2,3-dihydrobenzofuran, 2,3-dihydrobenzopyrrole, 2,3-dihydrobenzothiophene, dibenzofuran, xanthene, dibenzopyrol, or dibenzothiophene.

In preferred Aspects of this Embodiment, $R^2$ is an optionally substituted furan, pyrrole, thiophene, pyrazole, imidazole, benzofuran, benzopyrrole, benzothiophene, indole, azaindole dibenzofuran, xanthene, dibenzopyrrole, or dibenzothiophene moiety.

Embodiment 10. The method of any one of Embodiments 2 to 9, wherein $R^1$ and $R^2$ are optionally substituted with $C_{1-12}$ alkyl, $C_{1-12}$ alkoxyl, $C_{2-12}$ alkoxycarbonyl, $C_{6-20}$ aryloxy, $C_7$-$C_{21}$ arylkoxycarbonyl, $C_1$-$C_{20}$ alkylsulfanyl, $C_{6-20}$ arylsulfanyl, $C_1$-$C_{20}$ alkylsulfonyl, $C_{6-20}$ arylsulfonyl, $C_1$-$C_{20}$ alkylsulfinyl, carbamoyl, —$C_{2-20}$ carboxylato, di-$C_{1-20}$alkylaminocarbonyl, halo, cyano, isocyanate, mercapto, nitro, oligopeptide, peptide, polypeptide, polyglycol, thiocyanato, thioisocyanate, or sulfonato.

Embodiment 11. The method of any one of Embodiments 1 to 10, wherein the at least one hydrosilane comprises a hydrosilane or hydrosiloxane of Formula (I), Formula (II), Formula (III), or Formula (IV):

$$(R)_{3-m}Si(H)_{m+1} \quad (I)$$

$$R\text{-}[\text{---}SiH(R)\text{---}O\text{---}]_n\text{-}R \quad (II)$$

$$(R)_{2-m}(H)_{m+1}Si\text{---}Si(R)_{3-m}(H)_m \quad (III)$$

$$(R)_{3-m}(H)_m Si\text{---}Si(R)_{3-m}(H)_m \quad (IV)$$

where m is 0, 1, or 2;

n is 10 to 100; and each R is independently optionally substituted $C_{1-12}$ alkyl or $C_{1-12}$ heteroalkyl, optionally substituted $C_{6-20}$ aryl or $C_{5-20}$ heteroaryl, optionally substituted $C_{7-30}$ alkaryl or $C_{6-30}$ heteroalkaryl, optionally substituted $C_{7-30}$ aralkyl or $C_{6-30}$ heteroaralkyl, optionally substituted —O—$C_{1-12}$ alkyl or —O—$C_{1-12}$ heteroalkyl, optionally substituted —O—$C_{7-20}$ aryl or —O—$C_{5-20}$ heteroaryl, optionally substituted —O—$C_{7-30}$ alkaryl or —O—$C_{6-30}$ heteroalkaryl, or optionally substituted —O—$C_{7-30}$ aralkyl or —O—$C_{6-30}$ heteroaralkyl, and, if substituted, the substituents may be phosphonato, phosphoryl, phosphanyl, phosphino, sulfonato, $C_1$-$C_{20}$ alkylsulfanyl, $C_{6-20}$ arylsulfanyl, $C_1$-$C_{20}$ alkylsulfonyl, $C_{6-20}$ arylsulfonyl, $C_1$-$C_{20}$ alkylsulfinyl, $C_{6-20}$ arylsulfinyl, sulfonamido, amino, amido, imino, nitro, nitroso, hydroxyl, $C_1$-$C_{20}$ alkoxy, $C_{6-20}$ aryloxy, $C_2$-$C_{20}$ alkoxycarbonyl, $C_5$-$C_{20}$ aryloxycarbonyl, carboxyl, carboxylato, mercapto, formyl, $C_1$-$C_{20}$ thioester, cyano, cyanato, thiocyanato, isocyanate, thioisocyanate, carbamoyl, epoxy, styrenyl, silyl, silyloxy, silanyl, siloxazanyl, boronato, boryl, or halogen, or a metal-containing or metalloid-containing group, where the metalloid is Sn or Ge, or where the substituents optionally provide a tether to an insoluble or sparingly soluble support media comprising alumina, silica, or carbon.

Embodiment 12. The method of Embodiment 11, wherein the at least one hydrosilane comprises a hydrosilane or hydrosiloxane of Formula (I):

$$(R)_{3-m}Si(H)_{m+1} \quad (I).$$

Embodiment 13. The method of Embodiment 11, wherein the at least one hydrosilane comprises a hydrosilane or hydrosiloxane of Formula (III):

$$(R)_{2-m}(H)_{m+1}Si\text{—}Si(R)_{3-m}(H)_m \quad (III).$$

Embodiment 14. The method of Embodiment 12 or Embodiment 13, wherein m is 0 or 1.

Embodiment 15. The method of any one of Embodiments 11 to 14, wherein each R is independently $C_{1-6}$alkoxy, $C_{1-6}$alkyl, $C_{2-6}$alkenyl, phenyl, tolyl, benzyl, phenethyl, or pyridinyl.

Embodiment 16. The method of any one of Embodiments 11 to 14, where each R is independently $C_1$-$C_6$ alkyl.

Embodiment 17. The method of any one of Embodiments 1 to 10, wherein the at least one hydrosilane or hydrosiloxane comprises $EtMe_2SiH$, $Et_3SiH$, $(n-Bu)_3SiH$, $(i-Pr)_3SiH$, $Et_2SiH_2$, $Ph_2MeSiH$, $(t-Bu)Me_2SiH$, $(t-Bu)_2SiH_2$, $(2\text{-cyano-2-propyl})_2SiH_2$, $(3\text{-methyl-3oxetanyl})_2SiH_2$, $PhMeSiH_2$, $PhMe_2SiH$, $BnMe_2SiH$, $(EtO)_3SiH$, $Me_2(pyridinyl)SiH$, $(i-Pr)_2(pyridinyl)SiH$, or $Me_3Si\text{—}SiMe_2H$.

Embodiment 18. The method of any one of Embodiments 1 to 11, wherein the at least one hydrosilane or hydrosiloxane comprises $(R)_3SiH$, where each R is independently methyl, ethyl, propyl, or butyl.

Embodiment 19. The method of any one of Embodiments 1 to 11, wherein the at least one hydrosilane or hydrosiloxane comprises a polymethylhydrosiloxane.

Embodiment 20. The method of any one of Embodiments 1 to 19, wherein the at least one hydroxide or alkoxide comprises sodium hydroxide, potassium hydroxide, a sodium alkoxide, or a potassium hydroxide.

Embodiment 21. The method of any one of Embodiments 1 to 20, wherein the at least one hydroxide or alkoxide comprises sodium hydroxide, potassium hydroxide, a sodium alkoxide, or a potassium hydroxide.

Embodiment 22. The method of any one of Embodiments 1 to 20, wherein the at least one hydroxide or alkoxide comprises sodium hydroxide, potassium hydroxide, or a mixture thereof.

Embodiment 23. The method of any one of Embodiments 1 to 20, wherein the at least one hydroxide or alkoxide comprises a potassium alkoxide.

Embodiment 24. The method of any one of Embodiments 1 to 20, wherein the potassium alkoxide is potassium tert-butoxide.

Embodiment 25. The method of any one of Embodiments 1 to 24, wherein the mixture is free of added transition-metal species.

Embodiment 26. The method of any one of Embodiments 1 to 25, wherein the mixture is free of crown ether or cryptand.

Embodiment 27. An aromatic-substituted amino silane having an N—Si bond prepared or preparable by any one of the methods of claims 1 to 26.

Embodiment 28. A composition comprising:
(a) an organic substrate comprising an aromatic-substituted amine having at least one N—H bond;
(b) at least one hydrosilane or hydrosiloxane;
(c) at least one hydroxide or alkoxide; and
(d) optionally a silylated derivative of the organic substrate, wherein the silylated derivative has a N—Si bond in a position corresponding to a position in the organic substrate having the N—H bond.

In some Aspects of this Embodiment, the mixture is free of added solvent. In other Aspects, the mixture further comprises a solvent. In certain of these Aspects, the solvent is an aprotic oxygen donor solvent. In certain other Aspects, the aprotic oxygen donor solvent is or comprises dimethylacetamide (DMA), dimethyl formamide (DMF), dimethylsulfoxide, 1,2-dimethoxyethane (DME), a dioxane, a dialkyl ether, hexamethylphosphoramide (HMPA), N-methylpyrrolidone, tetrahydrofuran, 2-methyltetrahydrofuran, or a mixture thereof.

In some Aspects of this Embodiment, the mixture is substantially free of oxygen.

In some Aspects of this Embodiment, the mixture contains less than 100 ppm water, less than 50 ppm water, or is substantially free of water.

Embodiment 29. The composition of Embodiment 28, that is free of added:
(a) transition-metal species;
(b) crown ether or cryptand;
(c) hydride or alkyl lithium reagents, and/or
(d) fluoride ion.

EXAMPLES

The following Examples are provided to illustrate some of the concepts described within this disclosure. While each Example is considered to provide specific individual embodiments of composition, methods of preparation and use, none of the Examples should be considered to limit the more general embodiments described herein.

In the following examples, efforts have been made to ensure accuracy with respect to numbers used (e.g. amounts, temperature, etc.) but some experimental error and deviation should be accounted for. Unless indicated otherwise, temperature is in degrees C., pressure is at or near atmospheric.

Example 1: General Information

All reactions were carried out in dry glassware (e.g., oven- or flame-dried) under an argon atmosphere using standard Schlenk line techniques or in a Vacuum Atmospheres Glovebox under a nitrogen atmosphere unless specified otherwise. Products and product yields were characterized at least by in situ $^1H$ and $^{13}C$-NMR. Experimental methodologies similar to those previously described in U.S. Pat. Nos. 9,000,167 and 9,809,607 were employed in this work. The contents of these patents is incorporated by reference herein for their teachings of experimental methods.

Typically, experiments were conducted using ratios of aromatic-substituted amine substrate:hydrosilane:alkoxide/hydroxide base in ratios of 1 equiv.:0.5 to 1.5 equiv.:0.2 equiv., though the ratios of these reagents are flexible as described elsewhere herein.

Representative results are shown in the FIGS. 1-5(A/B).

Each patent, patent application, and publication cited or described in this document is hereby incorporated herein by reference, each in its entirety, for all purposes, or at least for the descriptions in the context in which it was cited.

What is claimed:

1. A method of preparing a compound of Formula (IA) or (IIA):

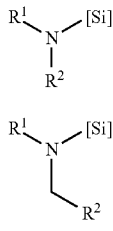

wherein
- $R^1$ is H, an optionally substituted alkyl, optionally substituted alkylene, optionally substituted alkenyl, optionally substituted alkenylene, optionally substituted alkynyl, optionally substituted alkynylene, optionally substituted aryl, optionally substituted arylene, optionally substituted heteroalkyl, optionally substituted heteroalkylene, optionally substituted heteroaryl, optionally substituted heteroarylene, or optionally substituted metallocene; and
- $R^2$ is an optionally substituted aryl or an optionally substituted heteroaryl group;
- wherein $R^1$ is optionally linked with $R^2$ to form a cyclic moiety such that $R^1$ is the optionally substituted alkylene, optionally substituted alkenylene, optionally substituted alkynylene, optionally substituted arylene, optionally substituted heteroalkylene, optionally substituted heteroarylene, or optionally substituted aralkylene;
- [Si] is —$(R)_2Si$—X, where X is H, $^{19}F$, or $^{18}F$, and
- R is independently an optionally substituted $C_{1-12}$ alkyl, an optionally substituted $C_{1-12}$ heteroalkyl group, and optionally substituted aryl group, or an optionally substituted heteroaryl group, and wherein the optional substituents in $R^1$ and $R^2$ are independently halo, optionally protected hydroxyl, sulfhydryl, $C_1$-$C_{24}$ alkyl, $C_2$-$C_{24}$ alkenyl, $C_2$-$C_{24}$ alkynyl, $C_1$-$C_{24}$ alkoxy, $C_2$-$C_{24}$ alkenyloxy, $C_2$-$C_{24}$ alkynyloxy, $C_5$-$C_{24}$ aryl, $C_6$-$C_{24}$ alkaryl, $C_6$-$C_{24}$ aralkyl, $C_5$-$C_{24}$ aryloxy, $C_6$-$C_{24}$ aralkyloxy, $C_6$-$C_{24}$ alkaryloxy, $C_1$-$C_{24}$ alkylcarbonyl, $C_6$-$C_{24}$ arylcarbonyl, $C_2$-$C_{24}$ alkylcarbonyloxy, $C_6$-$C_{24}$ arylcarbonyloxy, $C_2$-$C_{24}$ alkoxycarbonyl, $C_6$-$C_{24}$ aryloxycarbonyl, $C_2$-$C_{24}$ alkylcarbonato, $C_6$-$C_{24}$ arylcarbonato, carbamoyl, mono-($C_1$-$C_{24}$ alkyl)-substituted carbamoyl, di-($C_1$-$C_{24}$ alkyl)-substituted carbamoyl, mono-($C_5$-$C_{24}$ aryl)-substituted carbamoyl, di-($C_5$-$C_{24}$ aryl)substituted carbamoyl, N—($C_1$-$C_{24}$ alkyl), N—($C_5$-$C_{24}$ aryl)-substituted carbamoyl, optionally protected carboxylato, thiocarbamoyl, mono-($C_1$-$C_{24}$ alkyl)-substituted thiocarbamoyl, di-($C_1$-$C_{24}$ alkyl)-substituted thiocarbamoyl, mono-($C_5$-$C_{24}$ aryl)substituted thiocarbamoyl, di-($C_5$-$C_{24}$ aryl)-substituted thiocarbamoyl, N—($C_1$-$C_{24}$ alkyl), N—($C_5$-$C_{24}$ aryl)-substituted thiocarbamoyl, carbamido, cyano, cyanato, thiocyanato, thioisocyanate, formyl, thioformyl, optionally protected amino, mono-($C_1$-$C_{24}$ alkyl)-substituted amino, di-($C_1$-$C_{24}$ alkyl)-substituted amino, mono-($C_5$-$C_{24}$ aryl)substituted amino, di-($C_5$-$C_{24}$ aryl)-substituted amino, $C_2$-$C_{20}$ alkylimino, arylimino, mercapto, nitro, nitroso, sulfo, sulfonato, $C_1$-$C_{24}$ alkylsulfanyl, $C_5$-$C_{24}$ arylsulfanyl, $C_1$-$C_{24}$ alkylsulfinyl, $C_5$-$C_{24}$ arylsulfinyl, $C_1$-$C_{24}$ alkylsulfonyl, $C_1$-$C_{24}$ monoalkylaminosulfonyl, $C_1$-$C_{24}$ dialkylaminosulfonyl, $C_1$-$C_{24}$ aryl sulfonyl, oligopeptide, peptide, polypeptide, and/or polyglycol, the method comprising forming an N—Si bond by contacting an organic substrate comprising an aromatic-substituted amine having at least one N—H bond with a mixture comprising of (a) at least one hydrosilane and (b) at least one sodium hydroxide, potassium hydroxide, sodium alkoxide, or potassium alkoxide, under conditions sufficient to form the N—Si bond, wherein the mixture is free of added transition-metal species and the aromatic-substituted amine having at least one N—H bond has a structure of Formula (I) or Formula (II):

where
- $R^1$ is H, an optionally substituted alkyl, optionally substituted alkylene, optionally substituted alkenyl, optionally substituted alkenylene, optionally substituted alkynyl, optionally substituted alkynylene, optionally substituted aryl, optionally substituted arylene, optionally substituted heteroalkyl, optionally substituted heteroalkylene, optionally substituted heteroaryl, optionally substituted heteroarylene, or optionally substituted metallocene; and
- $R^2$ is an optionally substituted aryl or an optionally substituted heteroaryl group; and
- wherein $R^1$ is optionally linked with $R^2$ to form a cyclic moiety such that $R^1$ is the optionally substituted alkylene, optionally substituted alkenylene, optionally substituted alkynylene, optionally substituted arylene, optionally substituted heteroalkylene, optionally substituted heteroarylene, or optionally substituted aralkylene;
- wherein the at least one hydrosilane comprises a compound of Formula (I):

$(R)_{3-m}Si(H)_{m+1}$     (I)

where m is 1; and
- each R is independently optionally substituted $C_{1-12}$ alkyl, an optionally substituted $C_{1-12}$ heteroalkyl, an optionally substituted $C_{6-20}$ aryl, or an optionally substituted $C_5$-20 heteroaryl, and, if substituted, the substituents are independently optionally protected amino, amido, nitro, nitroso, optionally protected hydroxyl, $C_{1-20}$ alkoxy, $C_{6-20}$ aryloxy, $C_{2-20}$ alkoxycarbonyl, $C_{5-20}$ aryloxycarbonyl, carboxyl, optionally protected carboxylato, mercapto, formyl, $C_{1-20}$ thioester, cyano, cyanato, thiocyanato, isocyanate, thioisocyanate, carbamoyl, epoxy, or silyl
- to form the compound of Formula (IA) or (IIA), wherein X is H.

2. The method of claim 1, further comprising reacting the compound of Formula (IA) or (IIA), wherein X is H, with a reagent or reagents comprising $^{18}F^-$ or $^{19}F^-$ to form the compound of Formula (IA) or (IIA), wherein X is $^{18}F^-$ or $^{19}F^-$, respectively.

3. The method of claim 1, further comprising reacting the compound of Formula (IA) or (IIA), wherein X is H, with a K $^{18}F$ or $^{19}F$ in the presence of a crown ether to form the compound of Formula (IA) or (IIA), wherein X is $^{18}F$ or $^{19}F$, respectively.

4. The method of claim 3, further comprising reacting the compound of Formula (IA) or (IIA), wherein X is $^{19}F$, with a salt of $^{18}F^-$ to form the compound of Formula (IA) or (IIA), wherein X is $^{18}F$.

5. The method of claim 1, further comprising reacting the compound of Formula (IA) or (IIA), wherein X is H, with a halo, alkoxy, or hydroxy reagent to form an intermediate compound having a structure corresponding to a structure of Formula (IA) or (IIA), but where X is halo alkoxy, hydroxy, and then reacting that intermediate compound with a reagent or reagents comprising $^{18}F^-$ or $^{19}F^-$ to form the compound of Formula (IA) or (IIA), where X is $^{18}F$ or $^{19}F$, respectively.

\* \* \* \* \*